(12) United States Patent
Kim et al.

(10) Patent No.: US 8,599,946 B2
(45) Date of Patent: Dec. 3, 2013

(54) METHOD OF TRANSMITTING FEEDBACK INFORMATION FOR PRECODING AND PRECODING METHOD

(75) Inventors: Jae Wan Kim, Anyang-si (KR); Bin Chul Ihm, Anyang-si (KR); Jin Young Chun, Seoul (KR); Wook Bong Lee, Anyang-si (KR); Hyun Soo Ko, Anyang-si (KR); Jin Hyuk Jung, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 674 days.

(21) Appl. No.: 12/439,955

(22) PCT Filed: Sep. 5, 2007

(86) PCT No.: PCT/KR2007/004280
§ 371 (c)(1),
(2), (4) Date: Nov. 29, 2010

(87) PCT Pub. No.: WO2008/030035
PCT Pub. Date: Mar. 13, 2008

(65) Prior Publication Data
US 2011/0064156 A1    Mar. 17, 2011

Related U.S. Application Data

(60) Provisional application No. 60/824,587, filed on Sep. 5, 2006, provisional application No. 60/896,231, filed on Mar. 21, 2007, provisional application No. 60/896,826, filed on Mar. 23, 2007.

(30) Foreign Application Priority Data

Nov. 20, 2006  (KR) .......................... 10-2006-0114377
Jan. 24, 2007  (KR) .......................... 10-2007-0007587

(51) Int. Cl.
*H04B 7/02* (2006.01)
(52) U.S. Cl.
USPC ........... 375/267; 375/260; 375/259; 375/219; 375/295; 375/316
(58) Field of Classification Search
USPC .................. 375/267, 260, 259, 219, 295, 316
See application file for complete search history.

(56) References Cited

U.S. PATENT DOCUMENTS 7,676,007 B1 *  3/2010  Choi et al. .................... 375/347
7,881,395 B2 *  2/2011  Lee et al. ..................... 375/267
7,899,132 B2 *  3/2011  Lee et al. ..................... 375/295

(Continued)

FOREIGN PATENT DOCUMENTS

EP           1505847 A1    2/2005
KR     10-2007-0102121 A    10/2007

*Primary Examiner* — Kenneth Lam
(74) *Attorney, Agent, or Firm* — Birch, Stewart, Kolasch & Birch, LLP

(57) ABSTRACT

Precoding methods and method for performing precoding and methods of transmitting feedback information for precoding or transmitting a signal using a multi-codebook and method of transceiving precoding information in a multi-antenna system, where a signal transmitting method in a multi-antenna system, and more particularly, a method of transceiving precoding matrix information for a multi-input multi-output (MIMO) system is disclosed. The present invention proposes a method of performing communications using an expanded unitary matrix generated from shifting a phase of a base unitary matrix. The present invention is applicable to single user MIMO, multi-user MIMO, beam forming, etc.

19 Claims, 12 Drawing Sheets

(56) References Cited

U.S. PATENT DOCUMENTS

| | | | |
|---|---|---|---|
| 8,000,401 B2* | 8/2011 | Lee et al. | 375/260 |
| 8,175,182 B2* | 5/2012 | Lee et al. | 375/267 |
| 8,265,699 B2* | 9/2012 | Khojastepour | 455/561 |
| 2005/0286409 A1 | 12/2005 | Yoon et al. | |
| 2006/0039489 A1* | 2/2006 | Ikram et al. | 375/260 |
| 2007/0041457 A1* | 2/2007 | Kadous et al. | 375/260 |
| 2007/0097856 A1* | 5/2007 | Wang et al. | 370/210 |
| 2007/0104288 A1* | 5/2007 | Kim | 375/267 |
| 2007/0211671 A1 | 9/2007 | Cha | |
| 2007/0286304 A1* | 12/2007 | Kim et al. | 375/267 |

* cited by examiner (a)

(b)

(a)

(b)

(c)

(d)

METHOD OF TRANSMITTING FEEDBACK INFORMATION FOR PRECODING AND PRECODING METHOD

This application is the National Phase of PCT/KR2007/004280 filed on Sep. 5, 2007, which claims priority under 35 U.S.C. 119(e) to U.S. Provisional Application Nos. 60/824,587 filed on Sep. 5, 2006, 60/896,231 filed on Mar. 21, 2007, 60/896,826 filed on Mar. 23, 2007 and under 35 U.S.C. 119(a) to Patent Application Nos. 10-2006-0114377 and 10-2007-0007587 filed in the Republic of Korea on Nov. 20, 2006 and Jan. 24, 2007, respectively. All of which are hereby expressly incorporated by reference into the present application.

TECHNICAL FIELD

The present invention relates to a multi-antenna system, and more particularly, to a precoding method in a multi-antenna system.

BACKGROUND ART

First of all, a multi-antenna system for performing precoding using feedback information is explained as follows.

FIG. 1 is a block diagram of a multi-antenna system.

FIG. 1 is showing a configuration of a transmitting end of the a multi-antenna system and the transmitting end could be a base station or a UEuser equipment (UE). In the transmitting end, e.g. the base station, user data to be transmitted to a receiving end is inputted as a single stream or a multiplexed data stream to a channel encoder 101.

The channel encoder 101 performs channel encoding on the inputted single stream or the inputted multiplexed data stream.

A modulator 102 generates symbolized data by performing constellation mapping on a channel encoded signal.

The symbolized data are multiplied by a precoding matrix 103 and then transferred to the corresponding antennas 104, respectively.

Meanwhile, the receiving end transmits feedback information for the precoding matrix 103. In other words, the precoding matrix 103 used for precoding is preferably selected by the feedback information from the receiving end for the precoding matrix 103. And, a controller 105 of the transmitting end may select user or precoding matrix 103 using the feedback information.

To estimate MIMO (multi input multi output) channel, the receiving end transmits a non-precoded common pilot signal via the respective antennas of the transmitting end, e.g. the base station.

In the general communication technologies proposed by 3GPP LTE (long term evolution), e.g. PARC (per antenna rate control), PSRC (per stream rate control) and PU2RC (per user unitary rate control), the multi-antenna system can be implemented with the configuration shown in FIG. 1 as well.

The 3GPP LTE introduces a precoding scheme as a closed loop multi-antenna. Representatively, there are PU2RC, S-PUSRC (SIC-based per user and stream rate control), and the like.

In case of PU2RC, Fourier based matrix which may be expanded according to the number of transmitting antennas is used as a unitary precoding matrix.

$$e_m^{(g)} = \frac{1}{\sqrt{M}}\left[w_{0m}^{(g)} \ldots w_{(M-1)m}^{(g)}\right]^T, \quad w_{nm}^{(g)} = \exp\left\{j\frac{2\pi n}{M}\left(m + \frac{g}{G}\right)\right\}$$

In Formula 1, $e_m^{(g)}$ indicates a unitary precoding matrix and 'M' indicates a total number of transmitting antenna and 'G' indicates a total group number of precoding matrixes. 'n' indicates an index of $n^{th}$ antenna and 'g' indicates an index of $g^{th}$ group. So, it is able to specify a precoding matrix using 'n' and 'g'. And, 'm' indicates an $m^{th}$ virtual beam forming pattern.

In case of S-PUSRC, a switching beam forming vector is used as a precoding matrix.

$$P = [a_1 a_2 a_{2N}] \; a_1 = [1 e^{j\phi_r} \ldots e^{j(N-1)\phi_r}]^T \; \phi_i = kd\sin(\theta_i) \quad \text{[Formula 2]}$$

In Formula 2, 'N' indicates a total number of antenna, '$a_i$' indicates a $i^{th}$ precoding matrix, 'k' indicates a wavelength, 'θ' indicates a steering direction, and 'd' indicates a distance between antennas neighboring to each other.

The closed-loop multi-antenna system using the precoding schemes can support one of SDM (space division multiplexing) scheme for transmitting at least one data stream for a single user, SDMA (space division multiplexing access) scheme for transmitting data via a specific beam for each of multiple users, and a beam forming scheme for transmitting data by forming a specific beam. In the following description, the above three schemes are named, single-user MIMO, multi-user MIMO, and beam forming, respectively.

In the closed-loop system, in case of the single-user MIMO, accuracy varies according to a data quantity of antenna weight that is, feedback information from a receiving end (e.g., UE) to affect MIMO performance. In particular, if the number of antennas is equal to or greater than 4, a size of a codebook is raised. So, a data quantity of feedback information increases.

In case of the multi-user MIMO, if many precoding matrixes are used for a codebook design, it is difficult to perform grouping for multi-users. So, it is difficult to configure the MIMO system itself.

In case of the beam forming, an inter-antenna interval of the beam forming is different from that of the MIMO scheme. So, the transmitting system is unable to adopt both of the beam forming scheme and the MIMO scheme simultaneously.

DISCLOSURE OF THE INVENTION

Technical Solution

Accordingly, the present invention is directed to a precoding method that substantially obviates one or more of the problems due to limitations and disadvantages of the related art.

An object of the present invention is to provide a closed-loop multi-antenna system, by which system performance is enhanced.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a precoding method, in a transmitting end of a MIMO system, according to the present invention includes the steps of receiving feedback information for deciding a precoding matrix comprised using at least one of a base matrix and an expansion matrix generated from performing a phase shift on the base matrix and performing the precoding using the precoding matrix decided according to the received feedback information.

The base matrix may include at least one of a DFT (discrete Fourier Transform) matrix and an antenna selection matrix.

The phase shift may be carried out in a manner that an antenna beam pattern of the expansion matrix is phase shifted by an angle corresponding to an identical phase shift angle ($\Phi$, $\Phi \geq 0$) in comparison with a virtual beam pattern of the base matrix.

The precoding performing step may include the steps of deciding the precoding matrix corresponding to the feedback information using a codebook including the precoding matrix information amounting to the number corresponding to a bit number of the feedback information and performing the precoding using the decided precoding matrix.

The codebook may include at least one of the precoding matrix using a DFT matrix and the precoding matrix using an antenna selection matrix.

The codebook may include the precoding matrix adaptively decided according to a variation of the number of transmitting streams transmitted by the transmitting end.

The codebook may include the precoding matrix comprised using at least one or more expansion matrixes differing from each other in a phase shift angle ($\Phi$, $\Phi \geq 0$) and the precoding matrix is added in a manner that the bit number of the feedback information is incremented.

The antenna selection matrix may be configured in a manner of expanding the precoding matrix for transmitting antennas less than those included in the system.

A result of the precoding performing step may correspond to at least one data stream for at least one user.

To further achieve these and other advantages and in accordance with the purpose of the present invention, a method of transmitting feedback information for precoding in a receiving end of a MIMO system, includes the steps of receiving a signal from a transmitting end and transmitting feedback information for a precoding matrix generated from performing a phase shift by a phase shift angle ($\Phi$, $\Phi \geq 0$) decided through the received signal.

The phase shift angle ($\Phi$, $\Phi \geq 0$) may be decided to maximize a strength of the received signal.

The precoding matrix may be decided using a codebook including the precoding matrix information amounting to the number corresponding to a bit number of the feedback information.

The codebook may include the precoding matrix information adaptively decided according to a variation of the number of transmitting streams for the signal transmitted by the transmitting end. In this case, the codebook additionally may include at least one or more precoding matrixes differing from each other in the phase shift angle ($\Phi$, $\Phi \geq 0$) as the bit number of the feedback information is incremented.

The precoding matrix may be configured using at least one of a DFT (discrete Fourier transform) matrix and an antenna selection (AS) matrix.

The precoding matrix may be decided as the precoding matrix configured using the DFT matrix if a channel correlation for the received signal is high. The precoding matrix is decided as the precoding matrix configured using the antenna selection matrix if the channel correlation for the received signal is low.

To further achieve these and other advantages and in accordance with the purpose of the present invention, a method of performing precoding in an MIMO system includes the steps of performing the precoding using a phase diagonal matrix having a exponential coefficient value incremented linearly according to an index of a transmitting antenna and transmitting the precoded signal though the transmitting antenna.

Preferably, a phase of each virtual beam pattern may be shifted by an angle corresponding to an identical phase shift angle ($\Phi$, $\Phi \geq 0$).

The phase diagonal matrix $P(\Phi_i)$ may comprises $$P(\phi_i) = \begin{pmatrix} 1 & 0 & 0 & 0 \\ 0 & e^{j\phi_i} & 0 & 0 \\ 0 & 0 & e^{j2\phi_i} & 0 \\ 0 & 0 & 0 & e^{j3\phi_i} \end{pmatrix},$$

the $\Phi_i$ indicates an $i^{th}$ phase shift angle, and the i indicates the index of the phase shift angle.

To further achieve these and other advantages and in accordance with the purpose of the present invention, a precoding method in an OFDM (orthogonal frequency division multiplexing) MIMO system, includes the steps of performing the precoding using a result of multiplying a precoding matrix by a phase diagonal matrix having a exponential coefficient value incremented linearly according to an index of a transmitting antenna for an identical sub-frequency signal and transmitting the precoded signal via the transmitting antenna.

To further achieve these and other advantages and in accordance with the purpose of the present invention, a method of transceiving precoding information in an MIMO system, includes the steps of receiving a signal from a transmitting end and transmitting feedback information for a precoding matrix maximizing a strength of the received signal using a codebook including at least one precoding matrix information, wherein the codebook is configured through at least one of a precoding matrix configured through a unitary matrix and an antenna selection matrix.

The codebook may be expanded by further including the precoding matrix configured through at least one of a phase shifted DFT matrix and a phase shifted antenna selection matrix.

The codebook includes the precoding matrix information adaptively decided according to a variation of the number of transmitting streams for the signal transmitted by the transmitting end.

The codebook may include at least one sub-codebook.

The codebook may include a first sub-codebook and a second sub-codebook at a specific ratio in-between and the method further includes the step of receiving information for the specific ratio.

To further achieve these and other advantages and in accordance with the purpose of the present invention, a method of transmitting a signal using a multi-codebook in a communication system with multi-antennas, includes the steps of precoding the transmitted signal through the multi-codebook configured using at least one or more characteristic matrixes and transmitting the precoded transmitted signal via the multi-antennas.

The characteristic matrix may include at least one of a DFT matrix and an antenna selection matrix.

The multi-codebook may be configured by differently applying a selection ratio of the at least one or more characteristic matrixes by considering at least one of an array configuration of the multi-antennas and a channel correlation environment.

Information for the selection ratio may be exchanged between a transmitting end and a receiving end.

The multi-codebook may include a precoding matrix configured by combining a column vector included in the at least one or more characteristic matrixes.

The precoding may be performed by multiplying the transmitted signal by one of at least one or more precoding matrixes included in the multi-codebook.

The characteristic matrix may include an expanded characteristic matrix expanded using a phase shift matrix.

If the characteristic matrix is a DFT matrix, a phase shift angle included in the phase shift matrix may correspond to an angle sequentially generated from being equally divided between 0 and $\pi/2$. And if the characteristic matrix is an antenna selection matrix, the phase shift angle included in the phase shift matrix may correspond to an angle sequentially generated from being equally divided between 0 and $\pi$.

It is to be understood that both the foregoing general description and the following detailed description are exemplary and explanatory and are intended to provide further explanation of the invention as claimed.

Advantageous Effects

The present invention provides the following effects or advantages.

First of all, if the embodiments of the present invention are applied to single-user MIMO scheme, the number of indexes becomes smaller than that of the related art codebook design. Hence, a processing speed of UE can be enhanced.

Secondly, if the embodiments of the present invention are applied to single-user MIMO scheme, the present invention enables a design more flexible than the related art method according to a channel status.

Thirdly, if the embodiments of the present invention are applied to beam forming scheme, the present invention enables a transmission beam forming function efficient as many as the number of virtual antennas.

Fourthly, the present invention enables a precoding matrix to have expandability for the number of transmitting antennas.

Fifthly, the present invention generates an expansion matrix that enables a beam pattern of each transmitting antenna to perform phase shift at the same phase shift angle.

Sixthly, the present invention harmonically uses a unitary matrix and an antenna selecting scheme according to channel correlation, thereby enhancing reception performance.

Seventhly, the present invention becomes adaptive to the feedback bit number at a receiving end.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING INVENTION

Reference will now be made in detail to the preferred embodiments of the present invention, examples of which are illustrated in the accompanying drawings.

Figure 1:
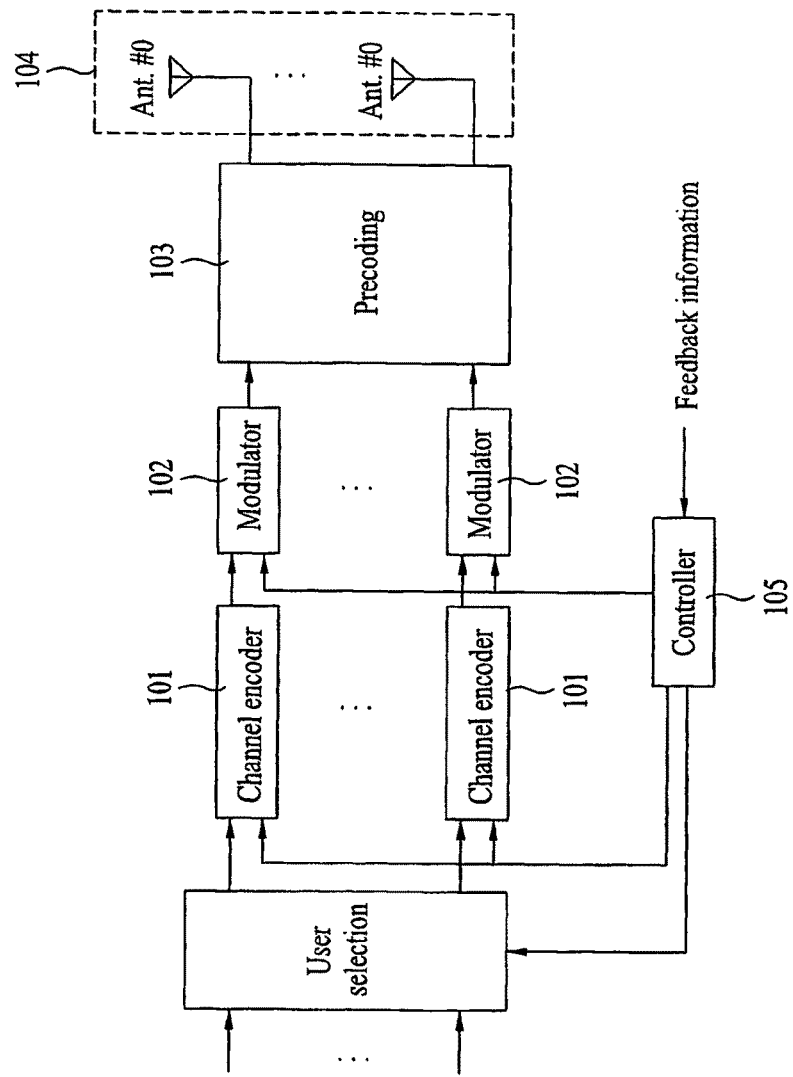
FIG. 1 is a block diagram of a multi-antenna system.
Figure 2:
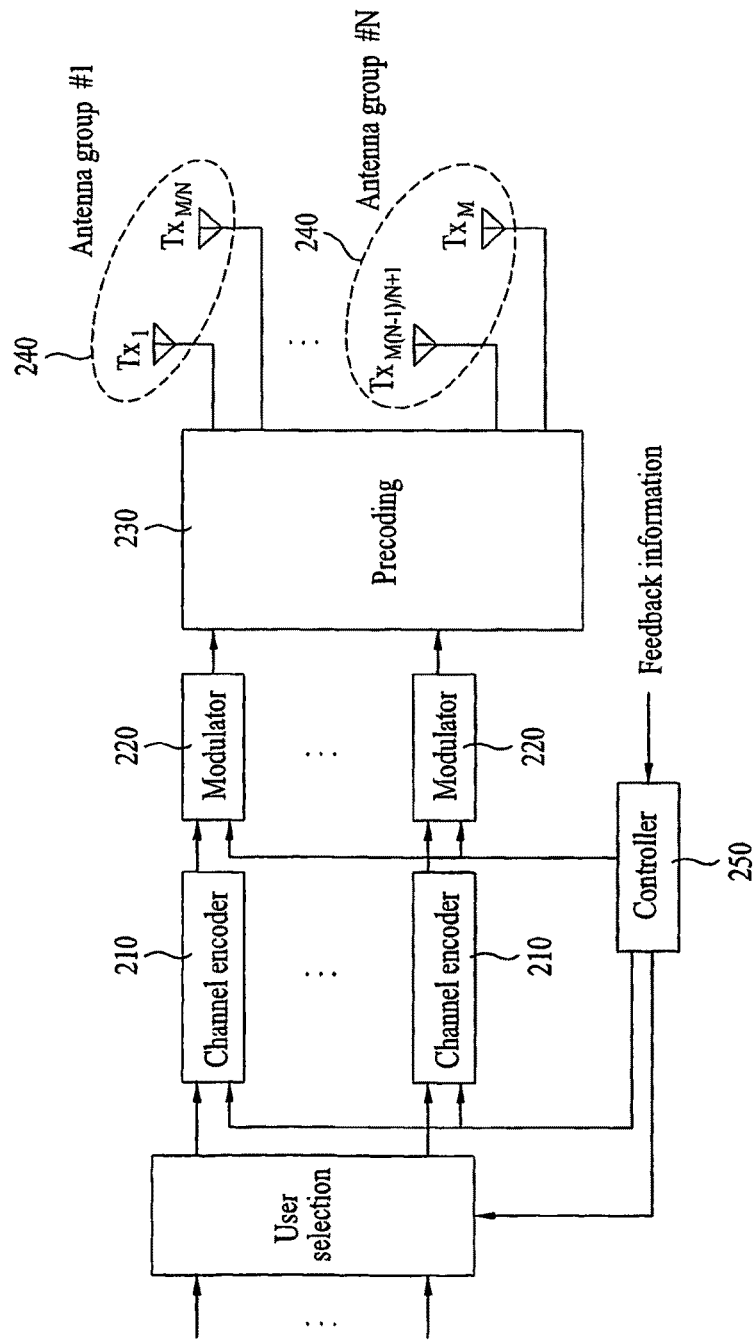
FIG. 2 is a block diagram of a transmitting end according to one embodiment of the present invention.

FIG. 2 is a block diagram of a transmitting end according to one embodiment of the present invention.

First of all, a transmitting end shown in FIG. 2 can be a base station or a UE. In the following description, it is assumed that a transmitting end is a base station. And, it is also assumed that a receiving end is a UE.

Referring to FIG. 2, user data which is supposed to be transmitted from a base station to a UE is inputted as a single stream or a multiplexed data stream into a channel encoder 210.

The channel encoder 210 shown in FIG. 2 performs channel encoding.

And, a modulator 220 performs constellation mapping.

A precoding block 230 according to one embodiment of the present invention performs precoding using a precoding matrix proposed by the embodiment of the present invention. A precoded signal is transmitted via a plurality of transmitting antennas 240. In this case, there can be a plurality of precoding matrixes. Preferably, a precoding matrix to be used is selected using feedback information received from the UE by a controller 250. And, the precoding block 230 is able to perform precoding by receiving a signal for specifying the selected precoding matrix from the controller 250.

In particular, the user data inputted to the channel encoder 210 can include a single stream or a multiplexed data stream. Each of the data streams undergoes constellation mapping for modulation through the modulator 220. The symbolized data are multiplied by a precoding matrix by the precoding block 230 and then transmitted to each antenna. The selection for the user or precoding matrix is controlled by the controller 250 with the feedback information from the UE.

In order for the UE to estimate MIMO channel H, the base station can transmit a non-precoded common pilot signal via each antenna.

To perform a beam forming function, it is able to configure N antenna groups, each of which includes a plurality of antennas spaced apart from each other with an interval $\lambda/2$. Preferably, a distance between the antenna groups is set to $4\lambda$ or $10\lambda$ to perform MIMO function. Since one antenna of each of the antenna groups is used in performing the MIMO function, N antennas can be used among the entire antennas. It is a matter of course that this antenna configuration is differently applicable according to an antenna transmission system.

In the following description, a precoding matrix, which can be multiplied by a precoding block 230 before symbolized data are transmitted via antenna, is explained.

According to the present embodiment, a precoding matrix can be generated by a manner of being extracted/selected from at least one of DFT (discrete Fourier Transform) matrix and antenna selection matrix that can be generated according to antenna selection (AS).

The matrix, which can generate a precoding matrix, such as the DFT matrix or the antenna selection matrix could be called a base matrix. This has a concept discriminated from that of an expansion matrix resulting from performing phase shift on each base matrix. In this case, the base matrix can have characteristics of a unitary matrix or a non-unitary matrix. The unitary matrix is the matrix that a total sum of inter-factor multiplications within each column of the matrix becomes zero, i.e., the matrix that the respective column vectors of the matrix are orthogonal to each other. The non-unitary matrix is the matrix that column vectors of the matrix are not orthogonal to each other. In the following description, it is assumed that the base matrix has the unitary matrix characteristics.

First of all, according to the present embodiment, a case of using DFT matrix as one of base matrixes for configuring various precoding matrixes will be explained. Specifically, the DFT matrix has a performance characteristic strong against a space channel having high correlation.

In case that the number of transmitting antennas is 2, the DFT matrix shown in Formula 3 is usable as a base matrix.

$$B_2 = [b_0 \ b_1] = \frac{1}{\sqrt{2}} \begin{bmatrix} 1 & 1 \\ 1 & -1 \end{bmatrix} \qquad \text{[Formula 3]}$$

In Formula 3, it is observed that column vectors of the matrix are orthogonal to each other. A first component of each column of the matrix corresponds to a first transmitting antenna and a second component of each column of the matrix corresponds to a second transmitting antenna. If the matrix shown in Formula 3 is used only, a receiving end (e.g., UE) transmits 1-bit feedback information to a transmitting end (e.g., base station) to perform communication according to SDM, SDMA or beam forming.

In case that the number of transmitting antennas is 4, the DFT matrix shown in Formula 4 is usable as a base matrix.

$$B_4 = [b_0 \ b_1 \ b_2 \ b_3] = \frac{1}{2} \begin{bmatrix} 1 & 1 & 1 & 1 \\ 1 & j & -1 & -j \\ 1 & -1 & 1 & -1 \\ 1 & -j & -1 & j \end{bmatrix} \qquad \text{[Formula 4]}$$

In Formula 4, like Formula 3, it is observed that column vectors of the matrix are orthogonal to each other. A first component of each column of the matrix corresponds to a first transmitting antenna, a second component of each column of the matrix corresponds to a second transmitting antenna, a third component of each column of the matrix corresponds to a third transmitting antenna, and a fourth component of each column of the matrix corresponds to a fourth transmitting antenna. If a single base matrix shown in Formula 4 is used only, a receiving end (e.g., UE) transmits 2-bit feedback information to a transmitting end (e.g., base station) to perform communication according to SDM, SDMA or beam forming.

Figure 3:
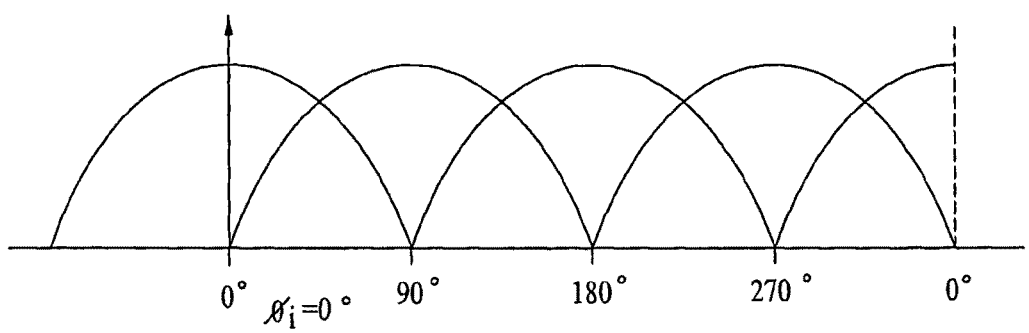
FIG. 3 is a diagram for beam patterns of a base matrix and an expansion matrix according to one embodiment of the present invention.
Figure 3:
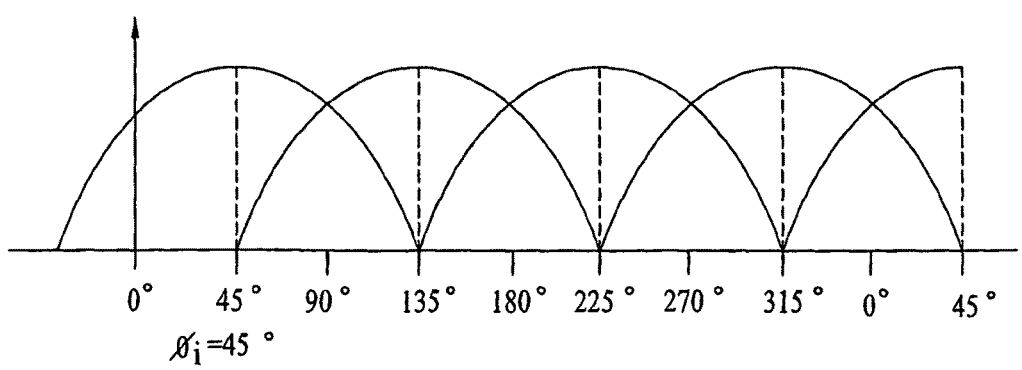
Figure 4:
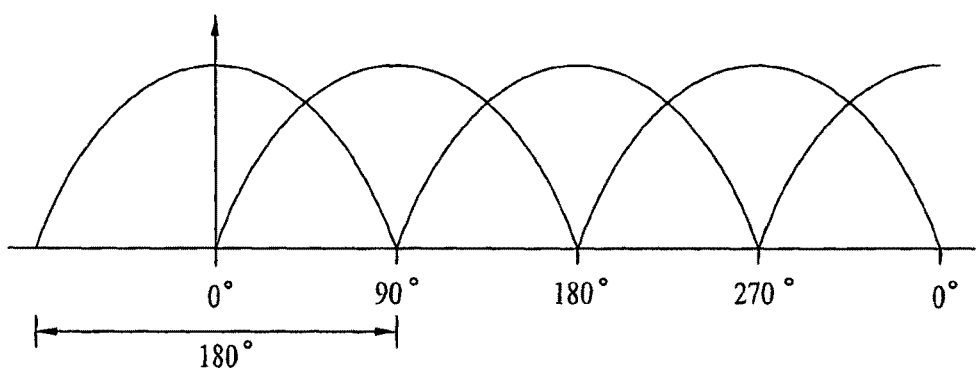
FIG. 4 is a diagram for a beam pattern of a base matrix and expansion matrixes according to one embodiment of the present invention.
Figure 4:
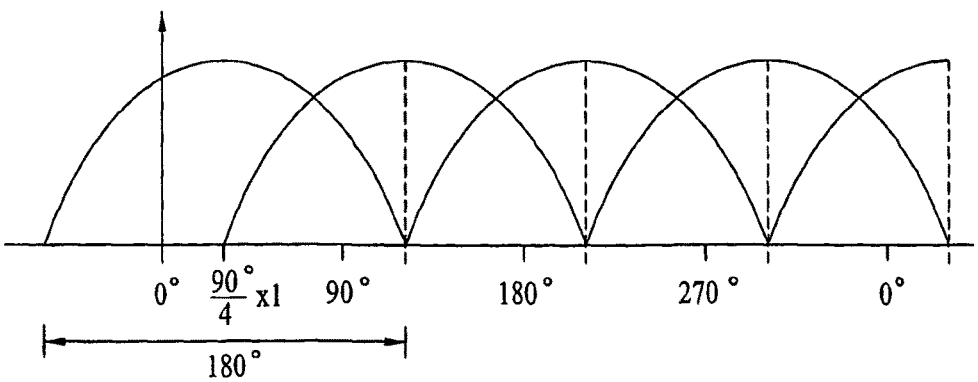
Figure 4:
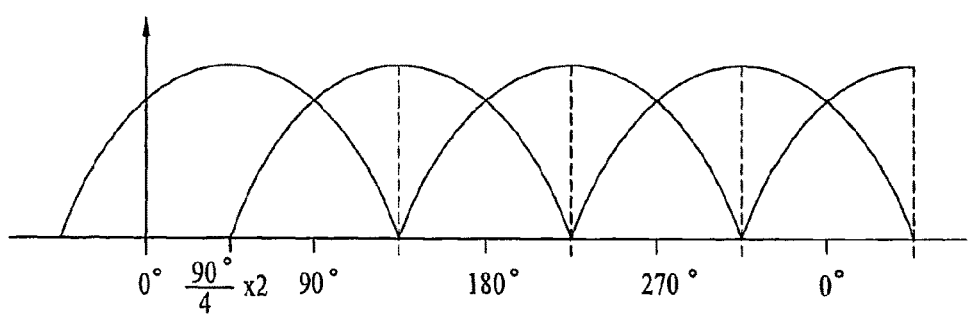
Figure 4:
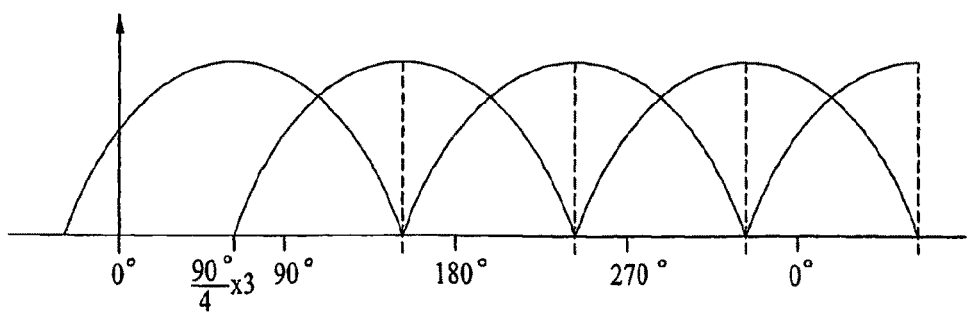

As mentioned in the foregoing description, it is able to configure a precoding matrix in a manner of combining at least one or more column vectors included in each of the matrixes shown in FIG. 3 and FIG. 4. The number of column vectors for configuring the precoding matrix can be determined according to the number of transmitting streams or rate. For instance, if the number of transmitting antennas is 4 and if the number of transmitting streams is 2, a 4*2 matrix can be used as a precoding matrix. In particular, two of the four column vectors are arbitrarily selected to be used as the precoding matrix.

According to the present embodiment, an antenna selection matrix according to antenna selection is explained as another base matrix that can configure various precoding matrixes as follows.

First of all, an exemplary antenna selection matrix usable for the case that the number of antennas is 2 is shown in Formula 5.

$$A_2 = [a_0 \ a_1] = \begin{bmatrix} 1 & 0 \\ 0 & 1 \end{bmatrix} \qquad \text{[Formula 5]}$$

In Formula 5, like the case of Formula 3, a first component of each column of the matrix corresponds to a first transmitting antenna and a second component of each column of the matrix corresponds to a second transmitting antenna. So, in case that the first column vector is used as a precoding matrix, the first transmitting antenna is used. In case that the second column vector is used as a precoding matrix, the second transmitting antenna is used.

The antenna selection usable for a case that the number of antennas is 4 is similar to that usable for the case that the number of antennas is 2. Although various kinds of antenna selection for 1 to 4 antennas are usable, a case of selecting two from four antennas is explained in the following description.

First of all, exemplary antenna selection matrixes usable in case of four antennas are shown in Formula 6.

$$A_4 = [a_0 a_1 a_2 a_3 a_4 a_5] = \frac{1}{\sqrt{2}} \begin{bmatrix} 1 & 1 & 1 & 0 & 0 & 0 \\ 1 & 0 & 0 & 1 & 0 & 1 \\ 0 & 1 & 0 & 1 & 1 & 0 \\ 0 & 0 & 1 & 0 & 1 & 1 \end{bmatrix} \qquad \text{[Formula 6]}$$

$$A_4 = [a_0 a_1 a_2 a_3 a_4 a_5 a_6 a_7 a_8 a_9 a_{10} a_{11}] =$$

$$\frac{1}{\sqrt{2}} \begin{bmatrix} 1 & 1 & 0 & 0 & 1 & 1 & 0 & 0 & 1 & 1 & 0 & 0 \\ 1 & -1 & 0 & 0 & 0 & 0 & 1 & 1 & 0 & 0 & 1 & 1 \\ 0 & 0 & 1 & 1 & 1 & -1 & 0 & 0 & 0 & 0 & 1 & -1 \\ 0 & 0 & 1 & -1 & 0 & 0 & 1 & -1 & 1 & -1 & 0 & 0 \end{bmatrix}$$

In Formula 6, like Formula 4, a first component of each column of the matrixes corresponds to a first transmitting antenna, a second component of each column of the matrixes corresponds to a second transmitting antenna, a third component of each column of the matrixes corresponds to a third transmitting antenna, and a fourth component of each column of the matrixes corresponds to a fourth transmitting antenna. So, in case that a first column vector of a first antenna selection matrix in Formula 6 is used as a precoding matrix, the first and second transmitting antennas are used. In case that a second column vector of a first antenna selection matrix in Formula 6 is used as a precoding matrix, the first and third transmitting antennas are used.

In case that one of third to sixth column vectors is used as a precoding matrix, like the above-explained case, a transmitting antenna corresponding to a row represented as '0' within each column vector is not used but data is transmitted using the rest of the antennas corresponding to a row represented as '1' within each column vector.

Likewise, in a second antenna selection matrix shown in Formula 6, a transmitting antenna corresponding to a row represented as '0' in each column vector is not used but data is transmitted using the rest of the antennas corresponding to a row represented as '1' within each column vector. Besides, in this case, data may be transmitted with a phase being rotated. For example to transmit using antenna corresponding to a row represented as '−1' within each column vector, data may be transmitted with a phase being rotated at 180 degrees.

An antenna selection matrix, which is usable in case that the number of antennas is 4, can be generated by expanding precoding matrixes usable in case that the number of antennas is smaller than 4, e.g., in case that the number of antennas is 2.

For example, the first antenna selection matrix in Formula 6 can be generated from expanding a first column vector of the precoding matrix of Formula 3 among precoding matrixes usable for the case that the number of antennas is 2.

In other words, an antenna selection matrix, which is usable for the case that the number of antennas is 2, can generate six column vectors for antenna selection matrix, which is usable for the case that the number of antennas is 4. For example antenna selection matrix which is usable for the case that the number of antennas is 4 can be generated in a manner of adding two zeros to each usable column vector and changing location of each row represented as '0'.

Likewise, the second antenna selection matrix of Formula 6 corresponds to an antenna selection matrix generated in a manner of expanding first and second column vectors of the precoding matrix of Formula 3 among procoding matrixes usable for the case that the number of antennas is 2.

Thus, the antenna selection matrix, which is usable for the case that the number of antennas is 4, can be easily generated by expanding each usable precoding matrix which is usable for the case that the number of antennas is smaller than 4 and this characteristic can be called scalability. Namely, by the method similar to the above description, the antenna selection matrix can be obtained in a manner of expanding an antenna selection matrix usable for the number of transmitting antennas smaller than that of transmitting antennas provided to a transmitting end.

Phase diagonal matrixes, which are usable independently from or together with the aforesaid embodiment of the present invention, are explained as follows. Formula 7 and Formulas 8A to 8C show examples of phase diagonal matrixes applicable to the transmitting antenna numbers 2 and 4, respectively.

$$P(\Phi_i) = \begin{pmatrix} 1 & 0 \\ 0 & e^{j\phi_i} \end{pmatrix}$$ [Formula 7]

$$P(\Phi_i) = \begin{pmatrix} 1 & 0 & 0 & 0 \\ 0 & 1 & 0 & 0 \\ 0 & 0 & e^{j\phi_i} & 0 \\ 0 & 0 & 0 & e^{j\phi_i} \end{pmatrix}$$ [Formula 8A]

$$P(\Phi_i) = \begin{pmatrix} 1 & 0 & 0 & 0 \\ 0 & e^{j\phi_i} & 0 & 0 \\ 0 & 0 & e^{j2\phi_i} & 0 \\ 0 & 0 & 0 & e^{j3\phi_i} \end{pmatrix}$$ [Formula 8B]

$$P(\Phi_i) = \begin{pmatrix} 1 & 0 & 0 & 0 \\ 0 & e^{j\phi_i} & 0 & 0 \\ 0 & 0 & 1 & 0 \\ 0 & 0 & 0 & e^{j\phi_i} \end{pmatrix}$$ [Formula 8C]

In Formula 7 and Formulas 8A to 8C, $\Phi_i$ indicates an $i^{th}$ phase shift angle in case of using an expansion matrix having at least one phase shift angle and 'i' means an index of a phase shift angle. And, it can be selected as a value enabling strength of a received signal to have a maximum value.

The phase shift angle $\Phi_i$ can have a value of 2 πm/M, for example. In this case, 'M' can be decided according to division into how many equal parts within a total phase, e.g., 2π to perform phase shift, 'm' indicates an $m^{th}$ virtual beam forming pattern to have an arbitrary integer among 0, 1, 2, . . . , M−1. In this case, $\Phi_i$ can have a value ranging between 0~2π. The variable range of the phase shift angle $\Phi_i$ varies according to a system to which a precoding matrix will be applied.

The phase diagonal matrix shown in Formula 7 or Formulas 8A to 8C can be named a phase shift matrix. In particular, it is able to shift a phase of a beam pattern corresponding to each column vector included in a base matrix by $\Phi_i$ in a manner of multiplying one of the phase diagonal matrixes shown in Formulas 8A to 8C by a DFT matrix, an antenna selection matrix or the like for example. The explanation associated with phase shift will be disclosed in detail together with the explanation of an expansion matrix later.

In an MIMO channel environment having variable channel correlation, two exemplary antenna configuring methods, i.e., cross polarization antenna and linear array antenna, applied to the present invention are explained as follows.

1. Case of Using Cross Polarization Antenna

First of all, a cross polarization antenna is an antenna that, if at least one polarization shared antenna transmits a radio wave having two independent polarizations, one polarization against the other polarization becomes a cross polarization for each other. For instance, in case of a straight polarization, cross polarization antenna transmits a radio wave having vertical and horizontal polarizations which mutually become cross polarizations, respectively.

A covariance matrix for a single tap in a specific channel model is shown in Formula 9. In this case, the tap means an index of each signal received at the same time zone.

$$\Gamma = \begin{pmatrix} 1 & \alpha^* \\ \alpha & 1 \end{pmatrix} \otimes P \otimes \begin{pmatrix} 1 & \beta^* \\ \beta & 1 \end{pmatrix} = \begin{pmatrix} Q & \alpha^* Q \\ \alpha Q & Q \end{pmatrix},$$ [Formula 9]

$$Q = P \otimes \begin{pmatrix} 1 & \beta^* \\ \beta & 1 \end{pmatrix}$$

$$\Gamma^{\frac{H}{2}} = \begin{pmatrix} Q^{\frac{H}{2}} & 0 \\ \alpha Q^{\frac{H}{2}} & \sqrt{1-|\alpha|^2} \; Q^{\frac{H}{2}} \end{pmatrix} =$$

$$\left( \begin{pmatrix} Q_{11}^{\frac{H}{2}} & 0 \\ Q_{12}^H Q_{11}^{\frac{-1}{2}} & X^H \end{pmatrix} \quad \begin{pmatrix} 0 & 0 \\ 0 & 0 \end{pmatrix} \right.$$

$$\left. \alpha \begin{pmatrix} Q_{11}^{\frac{H}{2}} & 0 \\ Q_{12}^H Q_{11}^{\frac{-1}{2}} & X^H \end{pmatrix} \quad \sqrt{1-|\alpha|^2} \begin{pmatrix} Q_{11}^{\frac{H}{2}} & 0 \\ Q_{12}^H Q_{11}^{\frac{-1}{2}} & X^H \end{pmatrix} \right)$$

In Formula 9, 'α' indicates an inter-antenna correlation value of a correlation matrix for a transmitting side, e.g., a base station and 'β' indicates an inter-antenna correlation value of a correlation matrix for a receiving side, e.g., a UE. So, in case that there exists no correlation between antennas, α and/or β can become '0'. And, 'X' in Formula 9 is a value corresponding to a position Q11 of a matrix resulting from decomposing a matrix Q by Cholesky decomposition. Since 'X' is not expressed in a closed form, it can be expressed as $X^H$.

A correlation channel $H_{corr}$ can be generated as Formula 10 through the covariance matrix $\Gamma^{H/2}$ shown in Formula 9 and an un-correlated channel $H_{un\text{-}corr}$.

$$vec(H_{corr}) = \Gamma^{\frac{H}{2}} vec(H_{un\text{-}corr}) \quad \text{[Formula 10]}$$

where $H_{un\text{-}corr} = [\, h_1 \; h_2 \; h_3 \; h_4 \,]$, $h_k$: iid column vector In Formula 10, an iid (independent and identically-distributed) column vector means that variables of each vector are mutually independent with identical probability distribution. In particular, $h_k$ means a channel vector in case that channels formed between transmitting/receiving antennas in MIMO channel are independent from each other with the identical probability distribution.

An average correlation matrix $E(H_{corr}{}^H H_{corr})$ for a specific channel model can be derived using the correlation channel $H_{corr}$ generated from Formula 10 and the average correlation matrix can be expressed as Formula 11.

[Formula 11]

$$E(H_{corr}^H H_{corr}) = \begin{pmatrix} E(h_1^H Q_{11}^{\frac{1}{2}} Q_{11}^{\frac{H}{2}} h_1) & 0 & E(\alpha h_1^H Q_{11}^{\frac{1}{2}} Q_{11}^{\frac{H}{2}} h_1) & 0 \\ 0 & E(h_2^H Q_{22}^{\frac{1}{2}} Q_{22}^{\frac{H}{2}} h_2) & 0 & E(\alpha h_2^H Q_{22}^{\frac{1}{2}} Q_{22}^{\frac{H}{2}} h_2) \\ E(\alpha^* h_1^H Q_{11}^{\frac{1}{2}} Q_{11}^{\frac{H}{2}} h_1) & 0 & E(h_1^H Q_{11}^{\frac{1}{2}} Q_{11}^{\frac{H}{2}} h_1) & 0 \\ 0 & E(\alpha^* h_2^H Q_{22}^{\frac{1}{2}} Q_{22}^{\frac{H}{2}} h_2) & 0 & E(h_2^H Q_{22}^{\frac{1}{2}} Q_{22}^{\frac{H}{2}} h_2) \end{pmatrix} = \begin{pmatrix} \delta & 0 & \alpha\delta & 0 \\ 0 & \delta & 0 & \alpha\delta \\ \alpha^*\delta & 0 & \delta & 0 \\ 0 & \alpha^*\delta & 0 & \delta \end{pmatrix}$$

A total average correlation matrix, which considers multi-paths and multi-taps for each of the multi-paths using the average correlation matrix for a single tap shown in Formula 11, can be expressed as Formula 12.

$$E(H_{corr}^H H_{corr}) = \sum_{k=1}^{K} p_k \begin{pmatrix} \delta_k & 0 & \alpha_k \delta_k & 0 \\ 0 & \delta_k & 0 & \alpha_k \delta_k \\ \alpha_k^* \delta_k & 0 & \delta_k & 0 \\ 0 & \alpha_k^* \delta_k & 0 & \delta_k \end{pmatrix} = \begin{pmatrix} \lambda & 0 & \mu & 0 \\ 0 & \lambda & 0 & \mu \\ \mu^* & 0 & \lambda & 0 \\ 0 & \mu^* & 0 & \lambda \end{pmatrix} \quad \text{[Formula 12]}$$

In Formula 12, 'k' which is shown as a lower suffix indicates an index for multi-taps and $P_k$ indicates a power for $k^{th}$ tap of the multi-taps. If left and right sides of the correlation matrix shown in Formula 12 are multiplied by the phase diagonal matrixes (e.g., Formula 8A) of the present embodiment, respectively, a cyclic matrix shown in Formula 13 can be obtained.

$$\begin{pmatrix} 1 & 0 & 0 & 0 \\ 0 & 1 & 0 & 0 \\ 0 & 0 & e^{j\phi_i} & 0 \\ 0 & 0 & 0 & e^{j\phi_i} \end{pmatrix} E(H_{corr}^H H_{corr}) \begin{pmatrix} 1 & 0 & 0 & 0 \\ 0 & 1 & 0 & 0 \\ 0 & 0 & e^{-j\phi_i} & 0 \\ 0 & 0 & 0 & e^{-j\phi_i} \end{pmatrix} = \quad \text{[Formula 13]}$$

$$\begin{pmatrix} 1 & 0 & 0 & 0 \\ 0 & 1 & 0 & 0 \\ 0 & 0 & e^{j\phi_i} & 0 \\ 0 & 0 & 0 & e^{j\phi_i} \end{pmatrix} \begin{pmatrix} \lambda & 0 & \mu & 0 \\ 0 & \lambda & 0 & \mu \\ \mu^* & 0 & \lambda & 0 \\ 0 & \mu^* & 0 & \lambda \end{pmatrix}$$

$$\begin{pmatrix} 1 & 0 & 0 & 0 \\ 0 & 1 & 0 & 0 \\ 0 & 0 & e^{-j\phi_i} & 0 \\ 0 & 0 & 0 & e^{-j\phi_i} \end{pmatrix} = \begin{pmatrix} \lambda & 0 & |\mu| & 0 \\ 0 & \lambda & 0 & |\mu| \\ |\mu| & 0 & \lambda & 0 \\ 0 & |\mu| & 0 & \lambda \end{pmatrix}$$

In Formula 13, it can be observed that diagonal components can be maintained by multiplying a phase diagonal matrix to a precoding matrix. So, it is expected that decoding performance in a receiving end can be enhanced. If a cyclic matrix requires a DFT matrix as an intrinsic matrix, a precoding matrix is extracted through a DFT matrix multiplied by a phase diagonal matrix. So, it is able to enhance performance for decomposing an intrinsic value for a correlation matrix. Formula 14 shows a matrix usable to extract a precoding matrix.

$$\left\{ \begin{pmatrix} 1 & 0 & 0 & 0 \\ 0 & 1 & 0 & 0 \\ 0 & 0 & e^{j\phi_i} & 0 \\ 0 & 0 & 0 & e^{j\phi_i} \end{pmatrix} (DFT \text{ or } IDFT \text{ 행렬}); \right. \quad \text{[Formula 14]}$$

$$\left. \phi_i = \frac{2\pi m}{M}, \; m = 0, 1, 2, \ldots, M-1 \right\}$$

As shown in Formula 14, the matrix can be generated from multiplying the phase diagonal matrix shown in Formula 8A by a DFT/IDFT matrix.

And, it is also able to extract a precoding matrix through an antenna selection matrix after phase adjustment that is, antenna selection matrix multiplied by a phase diagonal matrix. Formula 15 shows a matrix usable to extract a precoding matrix.

$$\left\{\begin{pmatrix} 1 & 0 & 0 & 0 \\ 0 & 1 & 0 & 0 \\ 0 & 0 & e^{j\phi_i} & 0 \\ 0 & 0 & 0 & e^{j\phi_i} \end{pmatrix}\begin{pmatrix} 1 & 0 & 1 & 0 \\ 0 & 1 & 0 & 1 \\ 1 & 0 & -1 & 0 \\ 0 & 1 & 0 & -1 \end{pmatrix}\frac{1}{\sqrt{2}};\right.$$
$$\left.\phi_i = \frac{\pi m}{M}, \ m = 0, 1, 2, \dots, M-1\right\}$$ [Formula 15]

As shown in Formula 15, the matrix can be generated from multiplying the phase diagonal matrix shown in Formula 8A by an antenna selection matrix If the cyclic matrix (cf. Formula 13) generated from multiplying the left and right sides of the correlation matrix by the phase diagonal matrix is multiplied by an antenna selection matrix, as shown in Formula 16, values except the diagonal components, become zeros. The values except the diagonal components can be recognized as noise by a receiving end. So, a more advantageous result of decoding is expected.

$$\frac{1}{\sqrt{2}}\begin{pmatrix} 1 & 0 & 1 & 0 \\ 0 & 1 & 0 & 1 \\ 1 & 0 & -1 & 0 \\ 0 & 1 & 0 & -1 \end{pmatrix}\begin{pmatrix} \lambda & 0 & |\mu| & 0 \\ 0 & \lambda & 0 & |\mu| \\ |\mu| & 0 & \lambda & 0 \\ 0 & |\mu| & 0 & \lambda \end{pmatrix}\frac{1}{\sqrt{2}}$$ [Formula 16]

$$\begin{pmatrix} 1 & 0 & 1 & 0 \\ 0 & 1 & 0 & 1 \\ 1 & 0 & -1 & 0 \\ 0 & 1 & 0 & -1 \end{pmatrix} = \begin{pmatrix} \lambda+|\mu| & 0 & 0 & 0 \\ 0 & \lambda+|\mu| & 0 & 0 \\ 0 & 0 & \lambda-|\mu| & 0 \\ 0 & 0 & 0 & \lambda-|\mu| \end{pmatrix}$$

Through the above detailed explanation, it is able to generate a precoding matrix using the phase diagonal matrix shown in Formula 8A and the DFT matrix for a case of using the cross polarization antenna. And, it is confirmed that a more advantageous effect can result from using an antenna selection matrix to which phase adjustment is performed using a phase diagonal matrix.

2. Case of Linear Array Antenna

First of all, a linear array antenna means an antenna configured to enable at least one or more antenna beam patterns to be put together in a manner of arraying the at least one or more antennas by a specific rule, e.g., a rule of linear array.

A total correlation matrix for linear array antenna is shown in Formula 17. The total correlation matrix for linear array antenna can be generated using a method similar to that of the aforesaid cross polarization antenna. That is, the total correlation matrix for linear array antenna can be corresponding to a total correlation matrix for cross polarization antenna.

$$E(H_{corr}^H H_{corr}) = \lambda \begin{pmatrix} 1 & \alpha & \alpha^2 & \alpha^3 \\ \alpha^* & 1 & \alpha & \alpha^2 \\ \alpha^{*2} & \alpha^* & 1 & \alpha \\ \alpha^{*3} & \alpha^{*2} & \alpha^* & 1 \end{pmatrix}$$ [Formula 17]

Formula 18 shows a process for multiplying left and right sides of a total correlation matrix for linear array antenna by phase diagonal matrixes, e.g., the phase diagonal matrixes shown in Formula 8B.

$$\begin{pmatrix} 1 & 0 & 0 & 0 \\ 0 & e^{j\phi_i} & 0 & 0 \\ 0 & 0 & e^{j2\phi_i} & 0 \\ 0 & 0 & 0 & e^{j3\phi_i} \end{pmatrix} E(H_{corr}^H H_{corr}) \begin{pmatrix} 1 & 0 & 0 & 0 \\ 0 & e^{-j\phi_i} & 0 & 0 \\ 0 & 0 & e^{-j2\phi_i} & 0 \\ 0 & 0 & 0 & e^{-j3\phi_i} \end{pmatrix} =$$ [Formula 18]

$$\begin{pmatrix} 1 & 0 & 0 & 0 \\ 0 & e^{j\phi_i} & 0 & 0 \\ 0 & 0 & e^{j2\phi_i} & 0 \\ 0 & 0 & 0 & e^{j3\phi_i} \end{pmatrix}\begin{pmatrix} 1 & \alpha & \alpha^2 & \alpha^3 \\ \alpha^* & 1 & \alpha & \alpha^2 \\ \alpha^{*2} & \alpha^* & 1 & \alpha \\ \alpha^{*3} & \alpha^{*2} & \alpha^* & 1 \end{pmatrix}$$

$$\begin{pmatrix} 1 & 0 & 0 & 0 \\ 0 & e^{-j\phi_i} & 0 & 0 \\ 0 & 0 & e^{-j2\phi_i} & 0 \\ 0 & 0 & 0 & e^{-j3\phi_i} \end{pmatrix} = \begin{pmatrix} 1 & |\alpha| & |\alpha|^2 & |\alpha|^3 \\ |\alpha| & 1 & |\alpha| & |\alpha|^2 \\ |\alpha|^2 & |\alpha| & 1 & |\alpha| \\ |\alpha|^3 & |\alpha|^2 & |\alpha| & 1 \end{pmatrix}$$

Through Formula 18, it is confirmed that a matrix having a configuration closer to that of a cyclic matrix can be obtained in a manner of multiplying left and right sides of a total correlation matrix for linear array antenna by a phase diagonal matrix, e.g., the phase diagonal matrix shown in Formula 8B when a correlation value $|\alpha|$ is smaller than 1.

Like the case of Formula 14, diagonal components can be maintained by multiplying a phase diagonal matrix to a precoding matrix. So, it is expected that decoding performance of a receiving end can be enhanced. Moreover, in this case, if a cyclic matrix requires a DFT matrix as an intrinsic matrix, a precoding matrix is configured using a DFT matrix multiplied by a phase diagonal matrix. So, it is able to expect enhanced performance in decomposing an intrinsic value for a correlation matrix.

Formula 19 shows a matrix usable to extract a precoding matrix.

$$\left\{\begin{pmatrix} 1 & 0 & 0 & 0 \\ 0 & e^{j\phi_i} & 0 & 0 \\ 0 & 0 & e^{j2\phi_i} & 0 \\ 0 & 0 & 0 & e^{j3\phi_i} \end{pmatrix}(DFT \text{ or } IDFT \text{ 병렬});\right.$$ [Formula 19]
$$\left.\phi_i = \frac{\pi}{2}\frac{m}{M}, \ m = 0, 1, 2, \dots, M-1\right\}$$

As shown in Formula 19, the matrix can be generated multiplying the phase diagonal matrix e.g., phase diagonal matrix shown in Formula 8B by a DFT matrix.

In Formula 20, it is confirmed that a matrix having a configuration closer to that of a cyclic matrix can be obtained.

$$\begin{pmatrix} 1 & 0 & 0 & 0 \\ 0 & e^{j\phi_i} & 0 & 0 \\ 0 & 0 & e^{j2\phi_i} & 0 \\ 0 & 0 & 0 & e^{j3\phi_i} \end{pmatrix} E(H_{corr}^H H_{corr}) \begin{pmatrix} 1 & 0 & 0 & 0 \\ 0 & e^{-j\phi_i} & 0 & 0 \\ 0 & 0 & e^{-j2\phi_i} & 0 \\ 0 & 0 & 0 & e^{-j3\phi_i} \end{pmatrix} =$$ [Formula 20]

-continued $$\begin{pmatrix} 1 & 0 & 0 & 0 \\ 0 & e^{j\phi_i} & 0 & 0 \\ 0 & 0 & e^{j2\phi_i} & 0 \\ 0 & 0 & 0 & e^{j3\phi_i} \end{pmatrix} \begin{pmatrix} 1 & \alpha & 0 & 0 \\ \alpha^* & 1 & \alpha & 0 \\ 0 & \alpha^* & 1 & \alpha \\ 0 & 0 & \alpha^* & 1 \end{pmatrix} \begin{pmatrix} 1 & 0 & 0 & 0 \\ 0 & e^{-j\phi_i} & 0 & 0 \\ 0 & 0 & e^{-j2\phi_i} & 0 \\ 0 & 0 & 0 & e^{-j3\phi_i} \end{pmatrix} =$$

$$\begin{pmatrix} 1 & |\alpha| & 0 & 0 \\ |\alpha| & 1 & |\alpha| & 0 \\ 0 & |\alpha| & 1 & |\alpha| \\ 0 & 0 & |\alpha| & 1 \end{pmatrix}$$

As shown in Formula 20, the result that left and right sides of a total correlation matrix for linear array antenna are multiplied by a phase diagonal matrix, e.g., the phase diagonal matrix shown in Formula 8B can be closer to cyclic matrix. In case that a correlation value $|\alpha|$ is approximate to 0, it is closer to cyclic matrix than otherwise cases.

As mentioned in the foregoing description, the cyclic matrix and/or the matrix approximate to the cyclic matrix can generate a matrix having a configuration more advantageous for decoding in a receiving end using an antenna selection matrix. Namely, it is able to configure a precoding matrix using a column vector of a matrix generated from the product of a phase diagonal matrix and an antenna selection matrix. If so, the aforesaid advantageous effects can be expected.

Formulas 21A and 21B show exemplary methods of using two kinds of antenna selection matrixes, respectively.

$$\left\{ \begin{pmatrix} 1 & 0 & 0 & 0 \\ 0 & e^{j\phi_i} & 0 & 0 \\ 0 & 0 & e^{j2\phi_i} & 0 \\ 0 & 0 & 0 & e^{j3\phi_i} \end{pmatrix} \begin{pmatrix} 1 & 0 & 1 & 0 \\ 0 & 1 & 0 & 1 \\ 1 & 0 & -1 & 0 \\ 0 & 1 & 0 & -1 \end{pmatrix} \frac{1}{\sqrt{2}}; \quad \phi_i = \frac{\pi}{2} \frac{m}{M}, \ m = 0, 1, 2, \ldots, M-1 \right\} \quad \text{[Formula 21A]}$$

$$\left\{ \begin{pmatrix} 1 & 0 & 0 & 0 \\ 0 & e^{j\phi_i} & 0 & 0 \\ 0 & 0 & e^{j2\phi_i} & 0 \\ 0 & 0 & 0 & e^{j3\phi_i} \end{pmatrix} \begin{pmatrix} 1 & 1 & 0 & 0 \\ 1 & -1 & 0 & 0 \\ 0 & 0 & 1 & 1 \\ 0 & 0 & 1 & -1 \end{pmatrix} \frac{1}{\sqrt{2}}; \quad \phi_i = \frac{\pi m}{M}, \ m = 0, 1, 2, \ldots, M-1 \right\} \quad \text{[Formula 21B]}$$

Through the aforesaid detailed explanation, a precoding matrix can be generated using the phase diagonal matrix shown in Formula 8B and the DFT matrix for a case of using the linear array antenna. This confirms that it is advantageous for a circumstance that correlation is relatively high.

Moreover, it is able to generate a precoding matrix using antenna selection matrix to which phase adjustment is performed using a phase diagonal matrix. This confirms that it is advantageous for a circumstance that correlation is relatively low as close as 0. Namely, it is able to generate and use a precoding matrix more efficiently in a manner of appropriately combining to use DFT matrix and antenna selection matrix according to a communication circumstance attributed to correlation.

According to another embodiment of the present invention, a base matrix and an expansion matrix generated from expanding from the base matrix can be used independently or together to configure a precoding matrix.

Explained in the following description is a method of generating an expansion matrix in a manner of expanding a base matrix such as a DFT matrix (cf. Formula 3 and Formula 4), an antenna selection matrix (cf. Formula 5 and Formula 6), and the like using the phase diagonal matrix (hereinafter called a phase shift matrix) shown in Formula 8B.

The expansion matrix can be obtained from performing a phase shift on a base matrix. In other words, the expansion matrix can be obtained from a product of a base matrix and a phase shift matrix (cf. Formula 7 and Formulas 8A to 8C). By multiplying a base matrix by a phase shift matrix, it is able to shift a phase of a beam pattern corresponding to each column vector included in the base matrix by a specific phase shift angle $\Phi_i$ in the phase shift matrix.

In particular, in case that the phase shift matrix shown in Formula 8B is used, a coefficient value, which will be multiplied to a phase shift angle $\Phi_i$ of each valid antenna included in each column vector increases linearly to correspond to the each valid antenna. In other words, the coefficient value multiplied to a phase shift angle $\Phi_i$ corresponds to an index of each valid antenna.

Thereafter, comparing to a base matrix, a phase of each beam pattern for each antenna is shifted by the same phase shift angle $\Phi_i$ to provide the phase-shifted beam pattern. Hereinafter expansion matrix using DFT matrix as base matrix is called expanded DFT matrix and expansion matrix using AS matrix as base matrix is called expanded AS matrix.

Formula 22 shows a process to generate an exemplary expanded DFT matrix.

$$\frac{1}{\sqrt{2}} \begin{bmatrix} 1 & 0 \\ 0 & e^{j\phi_i} \end{bmatrix} \begin{bmatrix} 1 & 1 \\ 1 & -1 \end{bmatrix} = \frac{1}{\sqrt{2}} \begin{bmatrix} 1 & 1 \\ e^{j\phi_i} & -e^{j\phi_i} \end{bmatrix} \quad \text{[Formula 22]}$$

In Formula 22, it is confirmed that the exemplary expanded DFT matrix can be generated by performing a phase shift using the phase shift matrix shown in Formula 7 for a DFT matrix shown in Formula 3 in case of using two transmitting antennas.

Formula 23 shows a process to generate an exemplary expanded DFT matrix.

$$\begin{bmatrix} 1 & 0 & 0 & 0 \\ 0 & e^{j\phi_i} & 0 & 0 \\ 0 & 0 & e^{j2\phi_i} & 0 \\ 0 & 0 & 0 & e^{j3\phi_i} \end{bmatrix} \begin{bmatrix} 1 & 1 & 1 & 1 \\ 1 & j & -1 & -j \\ 1 & -1 & 1 & -1 \\ 1 & -j & -1 & j \end{bmatrix} = \quad \text{[Formula 23]}$$

$$\frac{1}{2} \begin{bmatrix} 1 & 1 & 1 & 1 \\ e^{j\phi_i} & j \cdot e^{j\phi_i} & -e^{j\phi_i} & -j \cdot e^{j\phi_i} \\ e^{j2\phi_i} & -e^{j2\phi_i} & e^{j2\phi_i} & -e^{j2\phi_i} \\ e^{j3\phi_i} & -j \cdot e^{j3\phi_i} & -e^{j3\phi_i} & j \cdot e^{j3\phi_i} \end{bmatrix}$$

In Formula 23, it is confirmed that the exemplary expanded DFT matrix can be generated by performing a phase shift using the phase shift matrix shown in Formula 8B for a DFT matrix shown in Formula 4 in case of using four transmitting antennas.

Various methods can be proposed to generate a phase-shifted antenna selection (AS) matrix. Similar to the method of generating an expanded DFT matrix by multiplying the DFT matrix by a phase shift matrix, it is able to generate an expanded AS matrix by multiplying a base antenna selection matrix by the phase shift matrix shown in Formula 7 or Formulas 8A to 8C.

Alternatively, according to another method, an expanded antenna selection matrix usable for a case that the antenna number is 4, as explained in formula 6, can be generated using the expansion matrixes usable for the case that the antenna number is smaller than 4, e.g., for the case that the antenna number is 2.

For instance, the expanded antenna selection matrix can be generated using a first column vector of Formula 22 among the expansion matrixes usable for the case that the antenna number is 2. In other words, to configure the expanded antenna selection matrix usable for the case that the antenna number is 4, six column vectors can be generated for example in a manner of adding two zeros to each column vector of an expansion matrix usable for the case that the antenna number is 2 and changing a location of a row expressed as the zero.

Thus, the expanded antenna selection matrix usable for the case of the antenna number 4 can be easily generated using each expansion matrix usable for the case of the antenna number 2 in a manner similar to that of the base matrix and this characteristic can also be called scalability. In particular, by the method similar to the above-explained method, the expanded antenna selection matrix can be obtained from the method of using the expansion matrix usable for transmitting antennas of which number is smaller than that of transmitting antennas provided to a transmitting end.

In this case, an example of deciding a phase shift angle is explained as follows. First of all, in case of being multiplied by a DFT matrix, a phase shift angle $\Phi_i$ can be determined from angles that equally divide an angle between 0 and $\pi/2$ sequentially. For example, phase shift angle $\Phi_i$ can be selected among the angles of $\pi/4$, $\pi/8$, $3\pi/8$, etc. In other words, a first phase shift angle $\Phi_1$ can be preferentially determined to $\pi/4$ that equally divides the angle between 0 and $\pi/2$ and then a second phase shift angle $\Phi_2$ can be determined to $\pi/8$ that equally subdivides the angle between 0 and $\pi/4$.

And, in case of being multiplied by an antenna selection matrix, the phase shift angle $\Phi_i$ can be determined from angles that equally divide an angle between 0 and $\pi$ sequentially. For example, phase shift angle $\Phi_i$ can be selected among the angles of $\pi/2$, $\pi/4$, $3\pi/3$, etc. In other words, a first phase shift angle $\Phi_1$ can be first determined to $\pi/2$ that equally divides an angle between 0 and $\pi$ and then a second phase shift angle $\Phi_2$ can be determined to $\pi/4$ that equally subdivides an angle between 0 and $\pi/2$.

As mentioned in the foregoing description, the DFT matrix and the antenna selection matrix having undergone the phase shift through Formula 7 or Formulas 8A to 8C can also be named a phase shifted DFT (P-DFT) matrix and a phase shifted antenna selection (P-AS) matrix, respectively.

In this case, if the phase shift angle $\Phi_i$ becomes 0, an expansion matrix will be the matrix that is not phase-shifted, i.e., a base matrix or the like. In other words, the phase shifted DFT matrix and the phase shifted antenna selection matrix can include the concepts of both the base matrix and the expansion matrix.

Next drawings show phase shifts of beam patterns according to phase shifts of precoding matrixes with the antenna number 4 and the antenna interval $\lambda/2$. In the MIMO system, the phase shift method is identical but the antenna interval is changed into $4\lambda$ only.

FIG. 3 is a diagram for beam patterns of base matrix and expansion matrix according to one embodiment of the present invention.

A result of beam forming according to the base matrix, and more particularly, to DFT matrix and a result of beam forming according to an expansion matrix proposed by the present embodiment are explained with reference to FIG. 3 as follows.

The example in the following description corresponds to a case that total two matrixes including a base matrix and an expansion matrix are used. In this case, a first matrix, which is a base matrix, is set to $$\Phi_1\left(=\frac{90°}{2}\times 0\right)$$

in an expansion matrix (cf. (a) of FIG. 3). And, a second matrix is an expansion matrix set to $$\Phi_2\left(=\frac{90°}{2}\times 1\right)$$

in the expansion matrix (cf. (b) of FIG. 3).

A beam pattern by the first matrix for four transmitting antennas with an antenna interval $\lambda/2$ is shown in (a) of FIG. 3. And, a beam pattern by the second matrix for four transmitting antennas with an antenna interval $\lambda/2$ is shown in (b) of FIG. 3. Since the examples shown in (a) and (b) of FIG. 3 are for using two matrixes, it can be considered that eight column vectors or eight beam patterns exist. As mentioned in the foregoing description, since columns included in a single matrix have mutual orthogonality, the beam patterns shown in each of (a) and (b) of FIG. 3 have orthogonality as well. For instance, at a maximum point of a first beam, the other beams have null.

The beam patterns shown in (a) and (b) of FIG. 3 are provided with reference to an antenna having an antenna region between 0 and 360 degrees. If they are represented with reference to a sector antenna having an antenna region between 0 and 120 degrees, they are compressed by ⅓ to be shown.

Referring to (a) and (b) of FIG. 3, columns of a first matrix are orthogonal to each other and columns of a second matrix are orthogonal to each other. Yet, the columns of the first matrix, as shown in the drawings, may not be orthogonal to the columns of the second matrix.

Thus, the beam pattern using two matrixes are explained in the above description. A beam pattern using four matrixes (i.e., one base matrix and three expansion matrixes) is explained with reference to FIG. 4 as follows.

FIG. 4 is a diagram for a beam pattern of a base matrix and expansion matrixes according to one embodiment of the present invention.

In case of using a base matrix and three expansion matrixes, a first matrix, which is a base matrix, is set to $$\Phi_1\left(=\frac{90°}{4}\times 0\right)$$

in an expansion matrix (cf. (a) of FIG. 4). And, a second matrix is a first expansion matrix set to $$\Phi_2\left(=\frac{90°}{4}\times 1\right)$$

in the expansion matrix (cf. (b) of FIG. 4). A third matrix is a second expansion matrix set to $$\Phi_3 \left( = \frac{90°}{4} \times 2 \right)$$

in the expansion matrix (cf. (c) of FIG. 4). And, a fourth matrix is a third expansion matrix set to $$\Phi_4 \left( = \frac{90°}{4} \times 3 \right)$$

in the expansion matrix (cf. (d) of FIG. 4).

A beam pattern by the first matrix for four transmitting antennas with an antenna interval $\lambda/2$ is shown in (a) of FIG. 4. And, a beam pattern by the second matrix for four transmitting antennas with an antenna interval $\lambda/2$ is shown in (b) of FIG. 4. Moreover, a beam pattern by the third matrix for four transmitting antennas with an antenna interval $\lambda/2$ is shown in (c) of FIG. 4. Besides, a beam pattern by the fourth matrix for four transmitting antennas with an antenna interval $\lambda/2$ is shown in (d) of FIG. 4.

Since the examples shown in (a) to (d) of FIG. 4 are for using four matrixes, it can be considered that sixteen column vectors or sixteen beam patterns exist. As mentioned in the foregoing description, since columns included in a single matrix have mutual orthogonality, the beam patterns shown in each of (a) to (d) of FIG. 4 have orthogonality as well. For instance, at a maximum point of a first beam, the other beams have null.

The beam patterns shown in (a) to (d) of FIG. 4, like those of FIG. 3, are provided with reference to an antenna having an antenna region between 0 and 360 degrees. If they are represented with reference to a sector antenna having an antenna region between 0 and 120 degrees, they are compressed by ⅓ to be shown.

In case that expansion matrixes like the examples shown in (a) to (d) of FIG. 4 are used, a beam generated by a base matrix and expansion matrixes will be evenly distributed in an entire area. If a sector linear array antenna is used for real transmission, a distributed range of a beam corresponds to 0 to 120 degrees and a beam angle difference between matrixes will correspond to 30 degrees.

In summary, the phase shift angle $\Phi_i$ can be decided according to a width of a region covered by a matrix, i.e., to the number of matrixes. If the expansion matrix generating method according to the present embodiment is used through FIG. 3 and FIG. 4, a coefficient of phase shift angle linearly increases per each row component of a base matrix. So, beam pattern of each antenna can be provided with the identical phase shift angle.

Preferably, transmitting and receiving ends share information for a codebook, a precoding matrix or a phase shift angle $\Phi_i$. In particular, if a receiving end decides an optimal precoding matrix via a received signal and then transmits feedback information of the decided optimal precoding matrix to a transmitting end, the transmitting end decides a precoding value using the feedback information and then performs precoding with the decided precoding value.

All information for a codebook, a precoding matrix or a phase shift angle $\Phi_i$ can be transmitted and received to be shared. Yet, part of the information for a codebook, a precoding matrix or a phase shift angle $\Phi_i$ can be transmitted and received to be shared. In this case, the non-transmitted information can be inferred from the transmitted feedback information or the information can be shared via signaling on a system. For instance, the information for the phase shift angle $\Phi_1$ can be directly fed back or a value of $\Phi_i$ is calculated using feedback information of a precoding matrix index.

Figure 5:
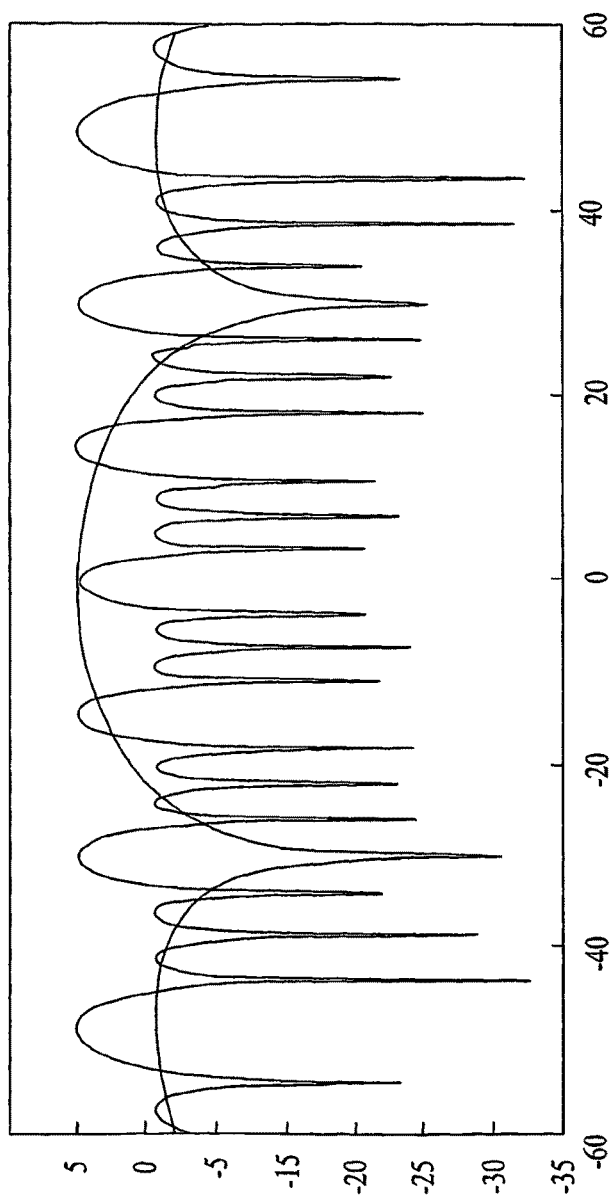
FIG. 5 is a diagram of a beam pattern on an orthogonal coordinate system according to one embodiment of the present invention.

Meanwhile, FIG. 5 is a diagram of a beam pattern on an orthogonal coordinate system according to one embodiment of the present invention.

In particular, FIG. 5 shows an beam pattern on an orthogonal coordinate system if the number of antennas is 4 and if an inter-antenna interval is set to $\lambda/2$ or $4\lambda$.

A narrow beam pattern corresponds to a case of $4\lambda$ and a wide beam pattern corresponds to a case of $\lambda/2$.

A method of applying expansion matrix generation to each subcarrier or resource block (RB) in OFDM (orthogonal frequency division multiplexing) according to another embodiment of the present invention is explained as follows.

If a phase shift matrix, which is to be applied to each subcarrier or resource block (RB), is represented as $P(\Phi_i k)$, Formula 22 and Formula 23 can be configured with expansion matrixes shown in Formula 24 and Formula 25, respectively.

$$\frac{1}{\sqrt{2}} \begin{bmatrix} 1 & 0 \\ 0 & e^{j\phi_i k} \end{bmatrix} \begin{bmatrix} 1 & 1 \\ 1 & -1 \end{bmatrix} = \frac{1}{\sqrt{2}} \begin{bmatrix} 1 & 1 \\ e^{j\phi_i k} & -e^{j\phi_i k} \end{bmatrix} \quad \text{[Formula 24]}$$

$$\begin{bmatrix} 1 & 0 & 0 & 0 \\ 0 & e^{j\phi_i k} & 0 & 0 \\ 0 & 0 & e^{j2\phi_i k} & 0 \\ 0 & 0 & 0 & e^{j3\phi_i k} \end{bmatrix} \begin{bmatrix} 1 & 1 & 1 & 1 \\ 1 & j & -1 & -j \\ 1 & -1 & 1 & -1 \\ 1 & -j & -1 & j \end{bmatrix} = \quad \text{[Formula 25]}$$

$$\frac{1}{2} \begin{bmatrix} 1 & 1 & 1 & 1 \\ e^{j\phi_i k} & j \cdot e^{j\phi_i k} & -e^{j\phi_i k} & -j \cdot e^{j\phi_i k} \\ e^{j2\phi_i k} & -e^{j2\phi_i k} & e^{j2\phi_i k} & -e^{j2\phi_i k} \\ e^{j3\phi_i k} & -j \cdot e^{j3\phi_i k} & -e^{j3\phi_i k} & j \cdot e^{j3\phi_i k} \end{bmatrix}$$

Formula 24 shows a result from expanding a codebook design on a frequency axis in a manner of adding an index k of sub-frequency (e.g., subcarrier) to apply the phase shift matrix shown in Formula 8B to an OFDM-MIMO transmitting system for a case that the number of antenna is 2.

And, Formula 25 shows a result from expanding a codebook design on a frequency axis in a manner of adding an index k of sub-frequency (e.g., subcarrier) to apply the phase shift matrix shown in Formula 8B to an OFDM-MIMO transmitting system for a case that the number of antenna is 4.

By expanding the codebook on the frequency axis, it is able to obtain a beam forming gain if a value of $\Phi_i$ is small. And, it is also advantageous in that a frequency diversity can be obtained on the frequency axis if a value of $\Phi_i$ is large. This codebook design is named FFT linear method in the present invention.

In order to apply a phase shift matrix to an OFDM-MIMO transmitting system, a sub-frequency index k is added. If the phase shift matrix having the sub-frequency index k added thereto is used for precoding in addition, it is able to perform a different phase shift for each of a plurality of transmitting antennas (e.g., four antennas) on a signal corresponding to the same sub carrier k. In other words, it is able to perform cyclic delay diversity in a manner of transmitting signals corresponding to the same subcarrier k via a plurality of transmitting antennas to have different delays.

A method of transceiving information for the precoding matrix between transmitting and receiving ends in the closed-loop system according to another embodiment of the present invention is explained as follows.

First of all, as mentioned in the foregoing description, when the information for the precoding matrix is transmitted between transmitting and receiving ends in the present embodiment, it is able to transmit information for a precoding matrix configuration or transmit index information in a manner of assigning an index for indicating each precoding matrix. In this case, the precoding matrixes can be configured to belong to a prescribed precoding matrix group. Namely, there can exist a predetermined rule for a configuration of a precoding matrix to be used under prescribed circumstances. And, the group including these precoding matrixes is formed to use.

In the aforesaid example, information for a precoding matrix group is transmitted or decided in advance. And information for indicating at least one the precoding matrixes included in the precoding matrix group is then transmitted. In this case, it is able to transmit an index allocated to indicate each of the precoding matrixes included in the corresponding precoding matrix group. By transmitting the index information only, it is able to reduce transmission overhead. And, the information for the precoding matrix group can be called a codebook.

Preferably, information for the codebook is known to a receiving end as well as a transmitting end. The codebook can be designed to consider the number of transmitting antennas, the number of transmitting streams, the number of feedback information bits, and the like.

As mentioned in the foregoing description, a configuration of the precoding matrix can be decided according to the number of transmitting antennas and the number of transmitting streams. For instance, if the number of the transmitting antenna is 4 and if the number of the transmitting stream is 2, precoding matrix is configured into 4*2 matrixes.

And, the codebook can include precoding matrixes as many as the number of feedback information bits. If the number of feedback information bits is 2, the codebook can include four precoding matrixes according to the aforesaid example. In particular, the codebook is designed to include information for at least one precoding matrix. And, the number of precoding matrixes included in a single codebook corresponds to the number of feedback information bits from a receiving end. For instance, if the number of feedback information bits is 2, four ($2*2=2^2$) precoding matrixes are needed. If the number of feedback information bits is 3, eight ($2*2*2=2^3$) precoding matrixes are needed. Namely, if the number of feedback information bits is n, $2^n$ precoding matrixes are needed.

In the following description, a symbol $C_{m,n}$ is used to discriminate a codebook for a specific case, In this case, 'C' indicates a codebook, indicates the number of antennas, and 'n' indicates the number of feedback information bits. For instance, $C_{2,1}$ means a codebook that uses 1 bit as feedback information for precoding matrix selection in a communication system using two transmitting antennas.

Formula 26 represents an exemplary codebook for a case of using three feedback information bits (abbreviated 3-bit codebook).

$$C_{4,3}=[W_0 W_1 W_2 W_3 W_4 W_5 W_6 W_7] \quad \text{[Formula 26]}$$

In Formula 26, it is observed that a codebook contains information for total eight precoding matrixes. In case that a receiving end uses an index to transmit the precoding matrix information, the index is assigned to indicates each of the precoding matrixes included in the codebook. The receiving end selects the precoding matrix from the codebook and then feeds back the index for the selected precoding matrix to a transmitting end. For instance, indexes 000 to 111 are sequentially assigned to the eight precoding matrixes $W_0$ to $W_7$, respectively.

As mentioned in the foregoing description, a precoding matrix as a codebook factor can be included in a codebook. And, a vector configuration of the precoding matrix can be decided according to the number of transmitting antennas, the number of transmitting streams or a rate. The number of transmitting antennas determines the number of rows of the precoding matrix. And, the number of the transmitting streams or the rate determines the number of columns of the precoding matrix. And, the precoding matrix can be configured to include at least one or more column vectors included in a base matrix and/or an expansion matrix. In this case, the base matrix includes the above-described DFT matrix, the antenna selection matrix or the like. And, the expansion matrix includes a matrix generated from expanding a base matrix such as a DFT matrix, an antenna selection matrix and the like using a phase diagonal matrix.

A precoding matrix as a codebook factor can be configured adaptive to the number of transmitting streams or rate. This characteristic can be called adaptivity. For instance, a precoding matrix can be defined in a manner of adaptively selecting column vectors amounting to the necessary number according to the number of transmitting streams or rate from a base matrix and/or an expansion matrix.

Namely, in case that the number of transmitting streams is 1, one column vector selected from a base matrix and/or an expansion matrix is defined as a precoding matrix. A codebook is then designed to include precoding matrixes as many as the number corresponding to a size of a codebook. In case that the number of transmitting streams is 2, two column vectors selected from a base matrix and/or an expansion matrix are defined as a precoding matrix. A codebook is then designed to include precoding matrixes a many as a size of a codebook. Likewise, in case that the number of transmitting streams is 3 or 4, three or four column vectors are selected from a base matrix or an expansion matrix and then defined as a precoding matrix to be used for a codebook design.

Examples of a codebook for a case of using three feedback information bits in a communication system using four transmitting antennas are explained as follows.

Codebook is designed by the above-described codebook design method. In particular, Formulas 28 to 31 show examples of designing a codebook using a phase shifted DFT matrix (cf. Formula 4 and Formula 23) and an antenna selection matrix (cf. Formula 6 for example) as a base matrix and/or an expansion matrix to select a precoding matrix.

$$\{P(\Phi_i)b_0, P(\Phi_i)b_1, P(\Phi_i)b_2, P(\Phi_i)b_3, P(\Phi_i)a_0, P(\Phi_i)a_1, P(\Phi_i)a_2, P(\Phi_i)a_3)\} \quad \text{[Formula 27]}$$

$$\{P(\Phi_i)[b_0 b_1], P(\Phi_i)[b_0 b_2], P(\Phi_i)[b_0 b_3], P(\Phi_i)[b_1 b_2], P(\Phi_i)[b_1 b_3], P(\Phi_i)[b_2 b_3], P(\Phi_i)[a_0 a_1], P(\Phi_i)[a_2 a_3]\} \quad \text{[Formula 28]}$$

$$\{P(\Phi_i)[b_0 b_1 b_2], P(\Phi_i)[b_0 b_2 b_3], P(\Phi_i)[b_0 b_1 b_3], P(\Phi_i)[b_1 b_2 b_3], P(\Phi_i)[b_1 b_2 b_0], P(\Phi_i)[b_1 b_3 b_0], P(\Phi_i)[a_0 a_1 a_2], P(\Phi_i)[a_5 a_6 a_7]\} \quad \text{[Formula 29]}$$

$$\{P(\Phi_i)[b_0 b_1 b_2 b_3], P(\Phi_i)[b_0 b_1 b_3 b_2], P(\Phi_i)[b_0 b_2 b_1 b_3], P(\Phi_i)[b_0 b_2 b_3 b_1], P(\Phi_i)[b_0 b_3 b_1 b_2], P(\Phi_i)[b_0 b_3 b_2 b_1], P(\Phi_i)[a_0 a_1 a_2 a_3], P(\Phi_i)[a_1 a_5 a_6 a_7]\} \quad \text{[Formula 30]}$$

Formulas 27 to 30 correspond to the cases of the transmitting stream numbers 1 to 4, respectively. If a value of $\Phi_i$ is 0, each precoding matrix including a phase diagonal matrix component will become a base matrix. And, a suitable value of $\Phi_i$ can be selected and used according to a communication circumstance. According to a codebook representation shown in Formula 26, precoding matrixes included in each codebook sequentially correspond to $W_0$ to $W_7$ in Formula 26, respectively.

A combination of precoding matrixes included in each codebook shown in Formulas 27 to 30 is exemplary. And, it is apparent to those skilled in the art that a codebook can be configured with various precoding matrix combinations.

In particular, in case of configuring a precoding matrix by combining column vectors b0 to b3 of the DFT matrix in Formula 4, a plurality of precoding matrixes can be configured according to a number of column vectors and an order of the column vectors to configure various codebooks having various combination of the plurality of precoding matrixes. In case of configuring a precoding matrix by combining column vectors a0 to a7 of an antenna selection matrix in $2^{nd}$ matrix combination in Formula 2, a plurality of precoding matrixes can also be configured in the same manner to configure various codebooks having various combination of the plurality of precoding matrixes.

As mentioned in the foregoing description, if a codebook is designed according to the present embodiment, it is able to adaptively design a codebook without designing each codebook to keep up with the variation of the number of the transmitting streams or rate.

In designing a codebook, rather than deciding a precoding matrix as a codebook factor using either a DFT matrix or an antenna selection matrix, it is more effective to define a precoding matrix, i.e., a codebook factor by considering the at least two kinds of matrixes (e.g., DFT matrix and AS matrix) as shown in Formulas 27 to 30. In particular, the kind of matrix from which a precoding matrix in a codebook is extracted can be decided according to a channel status. For example if a degree of channel correlation is high, a precoding matrix extracted from a DFT matrix advantageous for channel correlation is used. If a degree of channel correlation is low, a precoding matrix extracted from an antenna selection matrix can be used.

Figure 6:
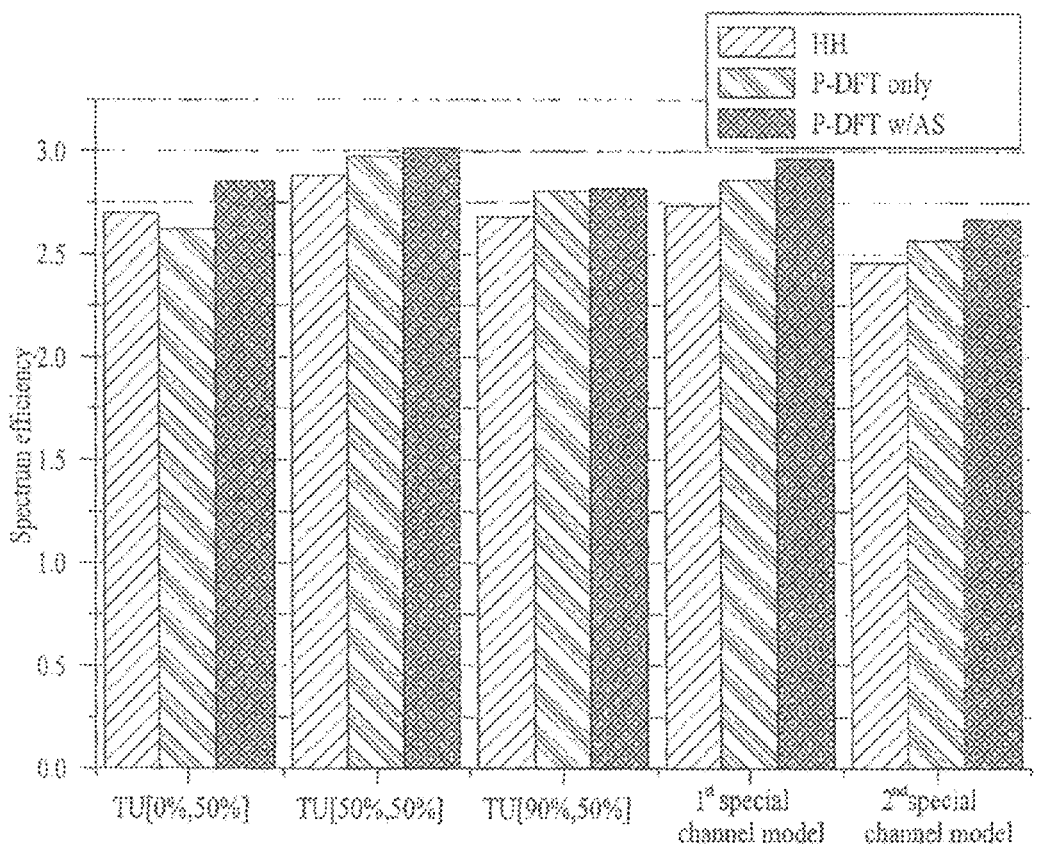
FIG. 6 is a diagram for spectrum efficiency of a codebook according to one embodiment of the present invention.

FIG. 6 is a diagram for spectrum efficiency of a codebook according to one embodiment of the present invention.

Referring to FIG. 6, it can be observed that a DFT matrix combined with antenna selection has performance better than that of using a DFT matrix only.

A horizontal axis of the graph shown in FIG. 6 indicates various channel models. In particular, channel models of TU[0%, 50%], TU[50%, 50%] and TU[90%, 50%], which are discriminated from each other according to a degree of correlation of a transmitting/receiving end in typical urban (TU) to correspond to spatial channel correlation, and special channel models including a first special channel model and a second special channel model are represented.

It can be observed from FIG. 6 that a codebook employing both of the antenna selection matrix and the DFT matrix has performance better than that of a householder (HH) based codebook or a codebook employing a phase shifted DFT (P-DFT) matrix only. Because of the fact that an adaptive phase based codebook is more suitable in case of high degree of channel correlation, the P-DFT system has performance relatively poorer than that of other codebook system. Yet, when a degree of channel correlation is low, if the antenna selection system is introduced into a codebook, it can be confirmed that performance can be considerably enhanced.

In the following description, precoding matrixes, which can be included in a codebook for a case that the number of feedback information bits is 4, are explained. Formula 31 represents an exemplary codebook for a case of using four feedback information bits.

$$C_{4,4} = [W_0 W_1 W_2 W_3 W_4 W_5 W_6 W_7 W_8 W_9 W_{10} W_{11} W_{12} W_{13} W_{14} W_{15}]$$ [Formula 31]

In Formula 31, a codebook includes information for total sixteen precoding matrixes. As mentioned foregoing description, an index for indicating each precoding matrix is assigned and a receiving end can feed back the indexes to a transmitting end. In this case, indexes 0000 to 1111 are sequentially assigned to sixteen precoding matrixes $W_0$ to $W_{15}$.

To configure a codebook for the case of using four feedback information bits (hereinafter abbreviated 4-bit codebook), an expansion matrix is generated through the aforesaid phase shift matrix and column vectors included in the generated expansion matrix can be used independently or additionally. This is applicable to the case of generating a codebook having a size larger than that of the 4-bit codebook.

A phase shift angle suitable for the generation of an expansion matrix is decided. For instance, when a receiving end, e.g., a UE applies MMSE for reconstruction of a received signal, the received signal can be expressed as $$\hat{x} = \left( w^H H^H H w + \frac{I}{SNR} \right)^{-1} H^H r.$$

Each UE searches for a column vector having a maximum reception $\rho = w^H H^H H w$ through channel estimation to make an SNR of the received signal have a maximum value and then decides an optimal phase shift angle. When information for the optimal phase shift angle fund by the receiving end is transmitted, a transmitting end generates an expansion matrix by applying the transmitted phase shift angle and then decides a precoding matrix and a codebook using the generated expansion matrix.

Referring to Formula 31, the codebook includes information for total sixteen precoding matrixes. The precoding matrixes included in the codebook are explained as follows. Indexes 0000 to 1111 are sequentially assigned to the precoding matrixes $W_0$ to $W_{15}$, as mentioned in the foregoing description, to be used for feedback information transmission/reception. And, the precoding matrixes shown in Formulas 28 to 31 are usable as precoding matrixes $W_0$ to $W_7$.

Example for each of the precoding matrixes $W_8$ to $W_{15}$ is explained through Formulas 32 to 35 as follows. In this case, if it is insufficient for a base matrix such as a DFT matrix to configure a precoding matrix required for a codebook design, antenna selection is usable to configure an additional precoding matrix. Alternatively, an expansion matrix using the above-explained phase shift is usable to configure an additional precoding matrix.

Likewise, it is able to design various codebooks using an expansion (unitary) matrix generated from another $j^{th}$ phase shift angle $\Phi_j$. In a communication system using four transmitting antennas, examples of a codebook for the case of using four feedback information bits are explained. The above-explained codebook designing method is employed. In particular, Formulas 32 to 35 show examples of designing a codebook using a DFT matrix in Formula 4 and an antenna selection matrix in second antenna selection matrix shown in Formula 6 as a base matrix and/or an expansion matrix to select a precoding matrix.

$$\{P(\Phi_j)b_0, P(\Phi_j)b_1, P(\Phi_j)b_2, P(\Phi_j)b_3, P(\Phi_j)a_4, P(\Phi_j)a_5, P(\Phi_j)a_6, P(\Phi_j)a_7)\}$$ [Formula 32]

$$\{P(\Phi_j)[b_0b_1], P(\Phi_j)[b_0b_2], P(\Phi_j)[b_0b_3], P(\Phi_j)[b_1b_2], P(\Phi_j)[b_1b_3], P(\Phi_j)[b_2b_3], P(\Phi_j)[a_0a_1], P(\Phi_j)[a_2a_3]\}$$ [Formula 33A]

$$\{P(\Phi_j)[b_0b_1], P(\Phi_j)[b_0b_2], P(\Phi_j)[b_0b_3], P(\Phi_j)[b_1b_2], P(\Phi_j)[b_1b_3], P(\Phi_j)[b_2b_3], P(\Phi_j)[a_4a_5], P(\Phi_j)[a_6a_7]\}$$ [Formula 33B]

$$\{P(\Phi_j)[b_0b_1b_2], P(\Phi_j)[b_0b_2b_3], P(\Phi_j)[b_0b_1b_3], P(\Phi_j) \\ [b_1b_2b_3], P(\Phi_j)[b_1b_2b_0], P(\Phi_j)[b_1b_3b_0], P(\Phi_j) \\ [a_0a_1a_2], P(\Phi_j)[a_5a_6a_7]\}$$ [Formula 34]

$$\{P(\Phi_j)[b_0b_1b_2b_3], P(\Phi_j)[b_0b_1b_3b_2], P(\Phi_j)[b_0b_2b_1b_3], P \\ (\Phi_j)[b_0b_2b_3b_1], P(\Phi_j)[b_0b_3b_1b_2], P(\Phi_j)[b_0b_3b_2b_1], \\ P(\Phi_j)[a_0a_1a_2a_3], P(\Phi_j)[a_1a_5a_6a_7]\}$$ [Formula 35]

As mentioned in the forgoing description, an expanding method of a codebook can additionally use a phase shift angle value that is an arbitrary fixed value. So, the phase shift method facilitates an expansion design of a codebook.

A 3-bit additional codebook is generated in a manner of finding a $j^{th}$ phase shift angle $\Phi_j$, e.g., $\pi/4$ for maximizing a received signal. In this case, an $i^{th}$ phase shift angle $\Phi_i$ is different from the $j^{th}$ phase shift angle $\Phi_j$. By generating total sixteen precoding matrixes by adding eight precoding matrixes, it is able to decide the total sixteen precoding matrixes included in Formula 31. The $\pi/4$ is just selected as an example of the $j^{th}$ phase shift angle $\Phi_j$. And, it is apparent to those skilled in the art that various values are usable as the $j^{th}$ phase shift angle $\Phi_j$.

For a 4-bit codebook including sixteen precoding matrixes, an expansion matrix having another phase shift angle or antenna selection scheme is usable to generate an additionally necessary precoding matrix. In case of using an antenna selection matrix according to the antenna selection, an antenna selection matrix having the same phase shift value identical to that used for the 3-bit codebook is usable. And, it is apparent to those skilled in the art that an antenna selection matrix having a value different from that used for the 3-bit codebook, i.e., an expanded antenna selection matrix can be generated to use.

Yet, in case of attempting to additionally use an antenna selection matrix having an identical phase shift angle $\Phi_i$, the added antenna selection matrix should differ from the antenna selection matrix previously included in the codebook. For instance, in case that there exists one transmitting stream, if a0 to a3 are used as antenna selection matrixes in the 3-bit codebook, it is preferable that at least one of a4 to a7 is used as antenna selection matrixes in the 4-bit codebook.

In case that the number of bits used by a receiving end to transmit feedback information is equal to or greater than 5, more expansion matrixes are usable as well as the above-explained two expanded matrixes. In particular, it is able configure a precoding matrix by generating another expansion matrix using a phase shift angle as well as the $i^{th}$ or $j^{th}$ phase shift angles ($\Phi_i$ or $\Phi_j$).

Figure 7:
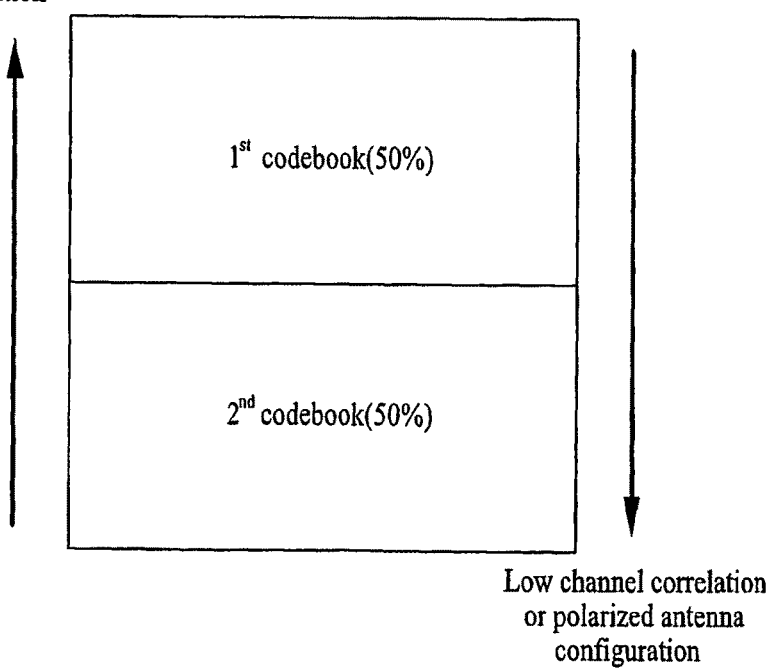
FIG. 7 is a diagram for a multi-codebook according to another embodiment of the present invention.

FIG. 7 is a diagram for a multi-codebook according to another embodiment of the present invention.

Referring to FIG. 7, a multi-codebook is a codebook generated from combining different codebooks having good performance according to a channel environment or the like. In particular, it is able to generate to use a multi-codebook using codebooks having different or opposite characteristics. For instance, it is able to generate and use a multi-codebook with channel correlation characteristics, antenna configurations, etc.

First of all, an example of configuring a multi-codebook according to a channel environment is explained. It is able to configure a first sub-codebook suitable for an environment having high correlation and a second sub-codebook having good performance in an environment having low correlation.

Alternatively, it is able to generate a multi-codebook according to an antenna configuration. For instance, a multi-codebook can include a first sub-codebook having good performance in case of a linear array antenna configuration and a second sub-codebook having good performance in case of a polarized antenna configuration.

In a base station or a UE, a ratio of a first sub-codebook to a second sub-codebook can be modified suitable for a channel environment or an antenna configuration according to interpretation of a channel correlation situation or antenna configuration. This multi-codebook configuration is applicable to another correlation or antenna configuration and also applicable to other similar cases.

In this case, the base station or UE is able to decide a multi-codebook having a specific ratio by giving multi-steps to a ratio of the generated multi-codebook according to the channel environment or the antenna configuration. Alternatively, the base station/UE decides the codebook ratio optimal to the channel environment or the antenna configuration and then notifies the decided ratio to the UE/base station to share the information to use. Hence, it is able to enhance radio transceiving performance using the multi-codebook.

Referring to FIG. 7, the ratio of the first sub-codebook to the second sub-codebook is set to 1:1. Yet, as mentioned in the foregoing description, the value of the first sub-codebook in the ratio can be raised in an environment having high channel correlation characteristic for example. In an environment that the channel correlation is very high, it is able to generate a whole codebook using the first sub-codebook only. According to the present embodiment, a whole codebook is designed using a DFT matrix. On the contrary, in a channel environment having a very low channel correlation, it is able to configure a whole codebook using the second sub-codebook only. In the present embodiment, a whole codebook is designed using an antenna selection matrix.

Hence, to enhance the transceiving performance in a radio channel communication environment, a multi-stepped codebook engaged between a base station and a UE is generated by a selection ratio of a first sub-codebook and a second sub-codebook according to channel correlation characteristic to share information in-between. The base station or UE interprets a channel environment and then performs transmission/reception by notifying the corresponding selection ratio to the corresponding UE or base station.

Formulas 38A to 38D show examples of multi-codebook configurations when a ratio of a codebook including a DFT matrix as an example of the first sub-codebook to a code book including an antenna selection matrix as an example of the second sub-codebook is set to 1:1.

$$\left\{\begin{array}{l} P(0)[B_0B_1B_2B_3],\ P(0)[B_0B_2B_1B_3],\ P(0)[B_0B_3B_1B_2],\ P\left(\frac{\pi}{4}\right)[B_0B_1B_2B_3], \\ P\left(\frac{\pi}{4}\right)[B_0B_2B_1B_3],\ P\left(\frac{\pi}{4}\right)[B_0B_3B_1B_2],\ P\left(\frac{\pi}{8}\right)[B_0B_1B_2B_3],\ P\left(\frac{\pi}{8}\right)[B_0B_2B_1B_3], \\ P(0)[A_0A_1A_2A_3],\ P(0)[A_0A_2A_1A_3],\ P(0)[A_0A_3A_1A_2],\ P(0)[A_4A_5A_6A_7], \\ P(0)[A_4A_6A_5A_7],\ P(0)[A_4A_7A_5A_6],\ P(0)[A_8A_9A_{10}A_{11}],\ P(0)[A_8A_{10}A_9A_{11}] \end{array}\right\}$$ [Formula 38A]

$$\begin{Bmatrix} P(0)[B_0B_1B_2], P(0)[B_0B_2B_3], P(0)[B_0B_1B_3], P(0)[B_1B_2B_3], \\ P(0)[B_1B_2B_0], P(0)[B_1B_3B_0], P\left(\frac{\pi}{4}\right)[B_0B_1B_2], P\left(\frac{\pi}{4}\right)[B_0B_2B_3] \\ P(0)[A_0A_1A_2], P(0)[A_0A_2A_3], P(0)[A_0A_1A_3], P(0)[A_1A_2A_3], \\ P(0)[A_1A_2A_0], P(0)[A_1A_3A_0], P(0)[A_4A_5A_6], P(0)[A_4A_6A_7], \end{Bmatrix}$$ [Formula 38B]

$$\begin{Bmatrix} P(0)[B_0B_1], P(0)[B_0B_2], P(0)[B_0B_3], P(0)[B_1B_2], \\ P(0)[B_1B_3], P(0)[B_2B_3], P\left(\frac{\pi}{4}\right)[B_0B_1], P\left(\frac{\pi}{4}\right)[B_0B_2], \\ P(0)[A_0A_1], P(0)[A_0A_2], P(0)[A_0A_3], P(0)[A_1A_2], \\ P(0)[A_1A_3], P(0)[A_2A_3], P(0)[A_4A_5], P(0)[A_4A_6] \end{Bmatrix}$$ [Formula 38C]

$$\begin{Bmatrix} P(0)B_0, P(0)B_1, P(0)B_2, P(0)B_3, \\ P\left(\frac{\pi}{4}\right)B_0, P\left(\frac{\pi}{4}\right)B_1, P\left(\frac{\pi}{4}\right)B_2, P\left(\frac{\pi}{4}\right)B_3, \\ P(0)A_1, P(0)A_3, P(0)A_5, P(0)A_7, \\ P(0)A_9, P(0)A_{11}, P(0)A_0, P(0)A_2 \end{Bmatrix}$$ [Formula 38D]

Formulas 38A to 38D correspond to the transmitting stream number 4 to 1 in 4-bit codebooks, respectively. Namely, Formulas 38A to 38D shows examples of multi-codebook configuration for the cases of rank-4, rank-3, rank-2 and rank-1, respectively.

In case of using a DFT matrix in each of Formulas 38A to 38D, the above-explained phase shift matrix is used and at least one of 0, $\pi/4$, and $\pi/8$ is used as a phase shift angle. In case of using an antenna matrix, a phase shift matrix is used and a phase shift angle is 0.

In this case, as mentioned in the foregoing description, in case of the DFT matrix, a phase shift angle generated from equally dividing an angle between 0 and $\pi/2$ is used to increase in a manner of $\pi/4$, $\pi/8$, $3\pi/8$, . . . . In case of the antenna selection matrix, a phase shift angle generated from equally dividing an angle between 0 and $\pi$ is used to increase in a manner of $\pi/2$, $\pi/4$, $3\pi/4$, . . . .

The codebooks shown in Formulas 38A to 38D are just exemplary. And, the selection ratio and/or phase shift angle for the codebook configuration can be selected suitable for various situations including the channel environment, the antenna configuration and the like to configure the multi-codebook.

The above-explained respective sub-codebooks can be generated using various matrixes. For instance, there are a householder (HH) based sub-codebook, a phase shift DFT (P-DFT) matrix based sub-codebook, a phase shift antenna selection (P-AS) matrix based sub-codebook, etc.

In this case, examples of the codebook including the householder based sub-codebook are shown in Table 1 and Table 2.

TABLE 1

| Vector index | 1st antenna element | 2nd antenna element | 3rd antenna element | 4th antenna element |
|---|---|---|---|---|
| w0 | 1 | −1 | −1 | −1 |
| w1 | 1 | −j | 1 | j |
| w2 | 1 | 1 | −1 | 1 |
| w3 | 1 | j | 1 | −j |
| w4 | 1 | (−1 − j)/√2 | −j | (1 − j)/√2 |
| w5 | 1 | (1 − j)/√2 | j | (−1 − j)/√2 |
| w6 | 1 | (1 + j)/√2 | −j | (−1 + j)/√2 |
| w7 | 1 | (−1 + j)/√2 | j | (1 + j)/√2 |
| w8 | 1 | 1 | 1 | 1 |
| w9 | 1 | −1 | −1 | j |
| w10 | 1 | j | j | −1 |

TABLE 1-continued

| Vector index | 1st antenna element | 2nd antenna element | 3rd antenna element | 4th antenna element |
|---|---|---|---|---|
| w11 | 1 | −j | −1 | −1 |
| w12 | 1 | 0 | 0 | 0 |

TABLE 2

| Vector index | 1st antenna element | 2nd antenna element | 3rd antenna element | 4th antenna element |
|---|---|---|---|---|
| w0 | 1 | −1 | −1 | −1 |
| w1 | 1 | −j | 1 | j |
| w2 | 1 | 1 | −1 | 1 |
| w3 | 1 | j | 1 | −j |
| w4 | 1 | (−1 − j)/√2 | −j | (1 − j)/√2 |
| w5 | 1 | (1 − j)/√2 | j | (−1 − j)/√2 |
| w6 | 1 | (1 + j)/√2 | −j | (−1 + j)/√2 |
| w7 | 1 | (−1 + j)/√2 | j | (1 + j)/√2 |
| w8 | 1 | −1 | −1 | 1 |
| w9 | 1 | 1 | −1 | −1 |
| w10 | 1 | j | 1 | j |
| w11 | 1 | −j | 1 | −j |
| w12 | 1 | 0 | 0 | 0 |

FIGS. 8A to 8D are diagram for beam patterns in antenna applied a phase shift scheme.

Referring to FIGS. 8A to 8D, it can be observed that a phase of a first beam is shifted according to $x_i$ corresponding to an $i^{th}$ phase shift angle $\Phi_i$.

Figure 8A:
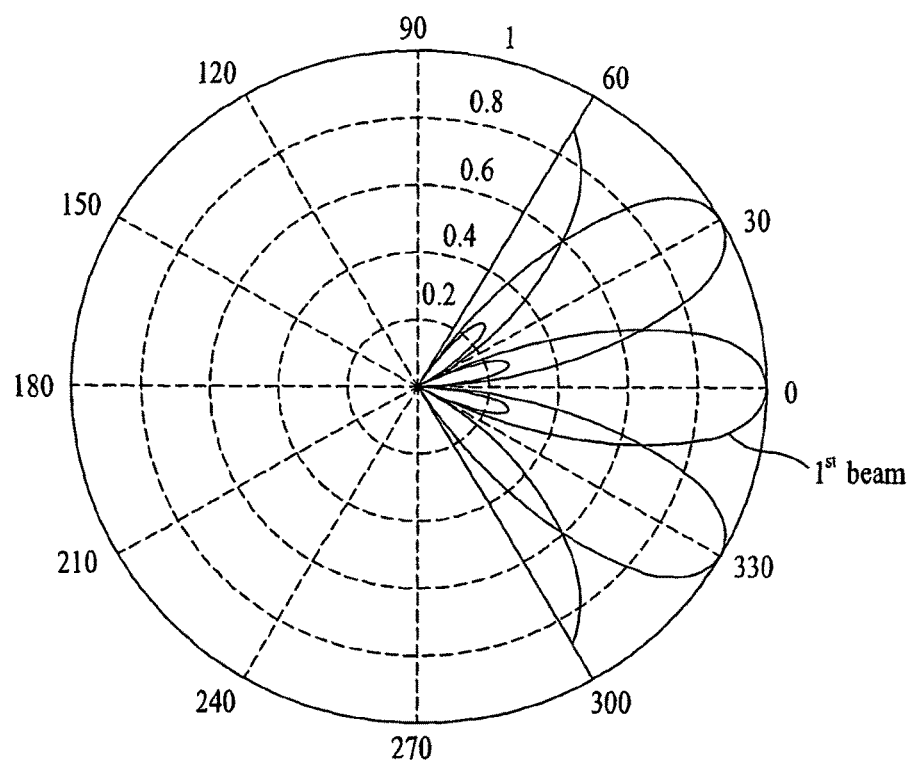
FIG. 8 is a diagram of phase-shifted beam patterns according to one embodiment of the present invention.
Figure 8B:
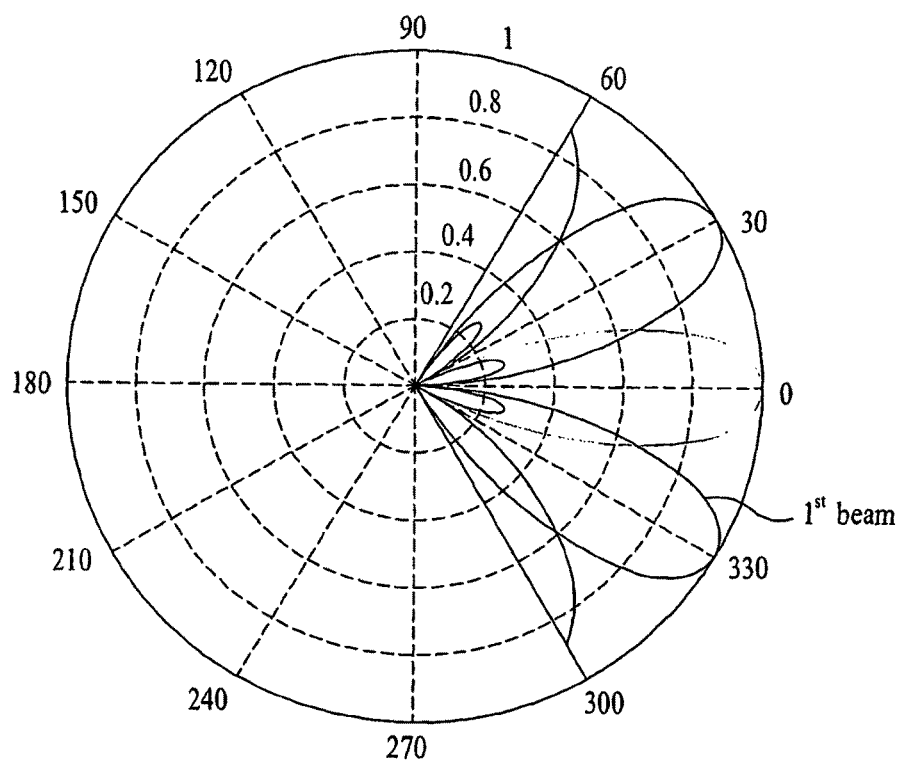
Figure 8C:
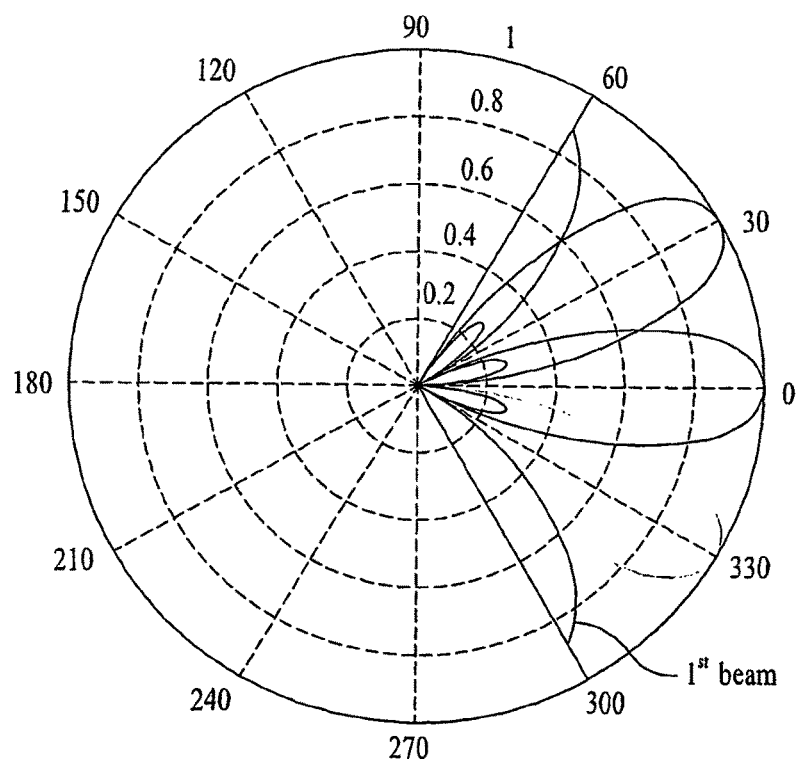
Figure 8D:
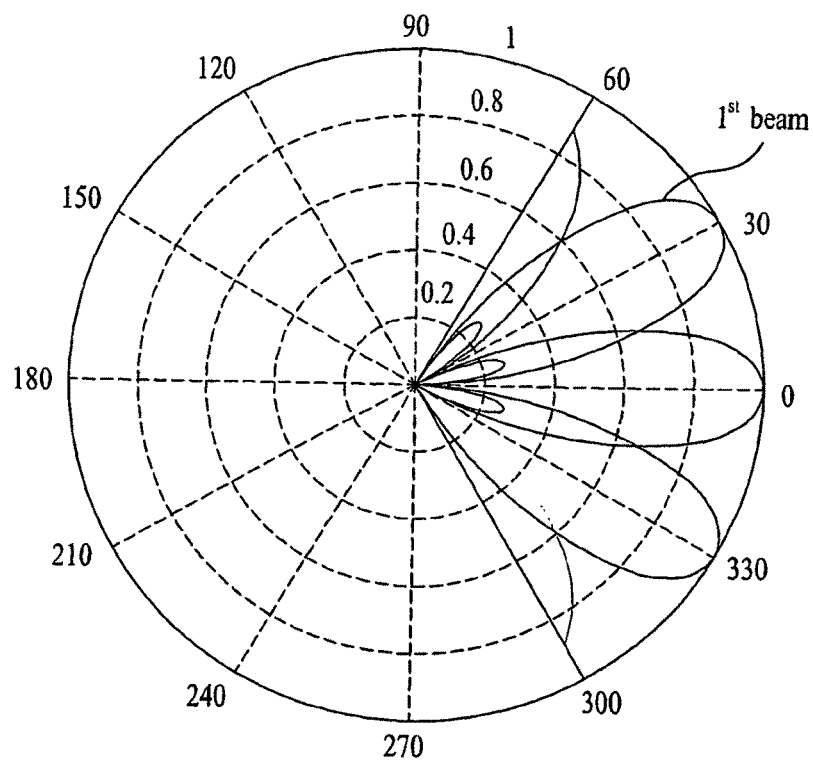

In particular, $x_i$ is set to 0 in FIG. 8A, $x_i$ is set to ½ in FIG. 8B, $x_i$ is set to 1 in FIG. 8C, and $x_i$ is set to −½ in FIG. 8D.

A closed-loop multi-antenna transceiving process proposed by an embodiment of the present invention can be summarized into the following five steps. And, the multi-antenna transceiving process is applicable to the SDM, the SDMA or the beam forming.

First Step (Calibration)

When a receiving end, e.g., a UE applies MMSE to reconstruction of a received signal, the received signal is represented as $$\hat{x} = \left(w^H H^H Hw + \frac{I}{SNR}\right)^{-1} H^H r.$$

Each UE finds a column vector enabling a maximum value of a reception $\rho = w^H H^H Hw$ to maximize an SNR of the received signal through channel estimation in an early stage using Formula 22 or Formula 23. And, it is able to find an optimal phase shift angle $\Phi_i$ thereof.

Second Step

A base station designs a codebook suitable for a current channel status using information for phase shift angles $\Phi_i$ transmitted from the UE. In this case, the codebook indicates a set of precoding matrixes.

Third Step

The UE reconstructs data using estimated channel information and the codebook decided in the second step. And, the UE frequently transmits feedback information e.g., a precoding matrix having a maximum value, an index for a base matrix, and CQI (channel quality indicator) information to the base station to enable to update the codebook.

Fourth Step

The base station decides single user MIMO, multi-user MIMO and beam forming according to the scheduling of a control unit with reference to the feedback information for the codebook, the vector index and the CQI information received from each user.

For instance, in case of applying SDM, the base station precodes and transmits four data streams ($s_1$, $s_2$, $s_3$, $s_4$) according to the following formula 36A.

$$\begin{bmatrix} 1 & 1 & 1 & 1 \\ e^{j\Phi_i} & je^{j\Phi_i} & -e^{j\Phi_i} & -je^{j\Phi_i} \\ e^{j2\Phi_i} & -e^{j2\Phi_i} & e^{j2\Phi_i} & -e^{j2\Phi_i} \\ e^{j3\Phi_i} & -je^{j3\Phi_i} & -e^{j3\Phi_i} & je^{j3\Phi_i} \end{bmatrix} \begin{bmatrix} s_1 \\ s_2 \\ s_3 \\ s_4 \end{bmatrix} \quad [\text{Formula 36A}]$$

In case of applying SDMA, the base station precodes and transmits data for four users ($u_1$, $u_2$, $u_2$, $u_4$) according to the following formula 36B.

$$\begin{bmatrix} 1 & 1 & 1 & 1 \\ e^{j\Phi_i} & je^{j\Phi_i} & -e^{j\Phi_i} & -je^{j\Phi_i} \\ e^{j2\Phi_i} & -e^{j2\Phi_i} & e^{j2\Phi_i} & -e^{j2\Phi_i} \\ e^{j3\Phi_i} & -je^{j3\Phi_i} & -e^{j3\Phi_i} & je^{j3\Phi_i} \end{bmatrix} \begin{bmatrix} u_1 \\ u_2 \\ u_3 \\ u_4 \end{bmatrix} \quad [\text{Formula 36B}]$$

In case of applying beam forming, data s can be precoded in a manner of selecting a specific one of four beams according to the following formula 36C.

$$\begin{bmatrix} 1 & 1 & 1 & 1 \\ e^{j\Phi_i} & je^{j\Phi_i} & -e^{j\Phi_i} & -je^{j\Phi_i} \\ e^{j2\Phi_i} & -e^{j2\Phi_i} & e^{j2\Phi_i} & -e^{j2\Phi_i} \\ e^{j3\Phi_i} & -je^{j3\Phi_i} & -e^{j3\Phi_i} & je^{j3\Phi_i} \end{bmatrix} \begin{bmatrix} 0 \\ s \\ 0 \\ 0 \end{bmatrix} \quad [\text{Formula 36C}]$$

Fifth Step

Modulation scheme or the like is decided for the selected multi-used MIMO (SDMA), single user MIMO (SDM) or beam forming using the received CQI information and then transmitted.

The present embodiment supports all of the beam forming, SDM and SDMA. In performing the beam forming function, an antenna interval is changed into $\lambda/2$. And, the beam forming is efficiently carried out using the identical codebook system.

In case of using the beam forming, no limitation is put on keeping the orthogonality between the phase shifted precoding matrixes. So, unlike the precoding MIMO mandatory to maintain the orthogonality, it is able to randomly select a preferred one from precoding matrixes. In order to minimize interference between beams (users) by maintaining inter-user orthogonality, the phase shift precoding codebook design proposed by the present embodiment can be used. In this case, the beam selection, i.e., the selection for the column vector $n_{opt}$ depends on Formula 37 if the number of transmitting antennas is K.

$$n_{opt} = \arg\max SINR_{n,k} = \frac{|w_n^T h|^2}{\sum_{i \neq n}^{K} |w_i^T h|^2 + \sigma^3} \quad [\text{Formula 37}]$$

In case of SDM, i.e., in case of applying the single user MIMO scheme, the UE feeds back an index of a precoding matrix and CQI information per antenna.

In case of SDMA, i.e., in case of applying the multi-user MIMO scheme, each user feeds back one CQI information and an index of a corresponding precoding matrix. Based on this, the base station can carry out grouping corresponding to a specific precoding matrix and then caries out scheduling according to priority.

Unlike the system such as PU2RC and the like, the present embodiment need not decide a precoding matrix combination but carries out a codebook designing step optimized to a channel status in a manner that a UE searches phase shift angle in an early stage. A base station decides a matrix combination having a high average frequency based on various kinds of phase shift information uploaded from each UE and then uses the decided combination as an actual codebook. Hence, the present invention enables a codebook design more suitable for an actual channel situation than that of the related art.

INDUSTRIAL APPLICABILITY

Accordingly, first of all, if the embodiments of the present invention are applied to single-user MIMO scheme, the number of indexes becomes smaller than that of the related art codebook design. Hence, a processing speed of UE can be enhanced.

Secondly, if the embodiments of the present invention are applied to single-user MIMO scheme, the present invention enables a design more flexible than the related art method according to a channel status.

Thirdly, if the embodiments of the present invention are applied to beam forming scheme, the present invention enables a transmission beam forming function efficient as many as the number of virtual antennas.

Fourthly, the present invention enables a precoding matrix to have expandability for the number of transmitting antennas.

Fifthly, the present invention generates an expansion matrix that enables a beam pattern of each transmitting antenna to perform phase shift at the same phase shift angle.

Sixthly, the present invention harmonically uses a unitary matrix and an antenna selecting scheme according to channel correlation, thereby enhancing reception performance.

Seventhly, the present invention becomes adaptive to the feedback bit number at a receiving end.

And, the present invention is applicable to single user MIMO, multi-user MIMO, beam forming, etc.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A precoding method in a transmitting end of a MIMO (Multiple Input Multiple Output) system, the precoding method comprising:
   receiving feedback information for deciding a precoding matrix comprised using at least one of a base matrix and an expansion matrix generated by performing a phase shift on the base matrix;
   performing the precoding using the precoding matrix decided according to the received feedback information; and
   transmitting data precoded by the precoding matrix,
   wherein the base matrix is selected one of a DFT (discrete Fourier Transform) matrix and an antenna selection matrix considering a spatial channel correlation, and
   wherein the base matrix is the DFT matrix when the spatial channel correlation is greater than a reference correlation, and the base matrix is the antenna selection matrix when the spatial channel correlation is less than or equal to the reference correlation.

2. The precoding method of claim 1, wherein the phase shift is carried out in a manner that an antenna beam pattern of the expansion matrix is phase shifted by an angle corresponding to an identical phase shift angle ($\Phi$, $\Phi \geq 0$) in comparison with a virtual beam pattern of the base matrix.

3. The precoding method of claim 1, the precoding performing step comprising the steps of:
   deciding the precoding matrix corresponding to the feedback information in a codebook including the precoding matrix information amounting to the number corresponding to a bit number of the feedback information; and
   performing the precoding using the decided precoding matrix.

4. The precoding method of claim 3, wherein the codebook includes a first sub-codebook including precoding vectors derived from the DFT matrix and a second sub-codebook including precoding vectors derived from the antenna selection matrix.

5. The method of claim 4, further comprising:
   transmitting information indicating a ratio between the first sub-codebook and the second sub-codebook.

6. The precoding method of claim 3, wherein the codebook includes the precoding matrix adaptively decided according to a variation of the number of transmitting streams.

7. The precoding method of claim 3, wherein the precoding matrix is added in a manner that the bit number of the feedback information is incremented and wherein the added precoding matrix comprised using at least one or more expansion matrixes with a different phase shift angle ($\Phi$, $\Phi \geq 0$) from each other.

8. The precoding method of claim 1, wherein the antenna selection matrix is configured in a manner of expanding the precoding matrix for transmitting antennas less than transmitting antennas included in the system.

9. The precoding method of claim 1, wherein a result of the precoding performing step corresponds to at least one data stream for at least one user.

10. The method of claim 1, wherein the expansion matrix is determined by a product of the base matrix and a phase diagonal matrix having an exponential coefficient value incremented linearly according to an index of a transmitting antenna.

11. A method for precoding in a receiving end of an MIMO (Multiple Input Multiple Output) system, the method comprising:
   transmitting feedback information for deciding a precoding matrix comprised using at least one of a base matrix and an expansion matrix generated by performing a phase shift on the base matrix; and
   receiving a signal which is precoded by the precoding matrix decided according to the feedback information,
   wherein the base matrix is selected one of a DFT (discrete Fourier Transform) matrix and an antenna selection matrix considering a spatial channel correlation, and
   wherein the base matrix is the DFT matrix when the spatial channel correlation is greater than a reference correlation, and the base matrix is the antenna selection matrix when the spatial channel correlation is less than or equal to the reference correlation.

12. The method of claim 11, wherein the phase shift is carried out in a manner that an antenna beam pattern of the expansion matrix is phase shifted by an angle corresponding to an identical phase shift angle ($\Phi$, $\Phi >= 0$) in comparison with a virtual beam pattern of the base matrix.

13. The method of claim 11, wherein the signal is precoded by the precoding matrix corresponding to the feedback information in a codebook including the precoding matrix information amounting to the number corresponding to a bit number of the feedback information.

14. The method of claim 13, wherein the codebook includes a first sub-codebook including precoding vectors derived from the DFT matrix and a second sub-codebook including precoding vectors derived from the antenna selection matrix.

15. The method of claim 14, further comprising:
   receiving information indicating a ratio between the first sub-codebook and the second sub-codebook.

16. The method of claim 13, wherein the codebook includes the precoding matrix adaptively decided according to a variation of the number of transmitting streams.

17. The method of claim 13, wherein the precoding matrix is added in a manner that the bit number of the feedback information is incremented and wherein the added precoding matrix comprised using at least one or more expansion matrixes with a different phase shift angle ($\Phi$, $\Phi > 0$) from each other.

18. The method of claim 11, wherein the antenna selection matrix is configured in a manner of expanding the precoding matrix for transmitting antennas less than transmitting antennas included in the system.

19. The method of claim 11, wherein the expansion matrix is determined by a product of the base matrix and a phase diagonal matrix having an exponential coefficient value incremented linearly according to an index of a transmitting antenna.

* * * * *